United States Patent
Chakrabarty et al.

(10) Patent No.: US 11,573,023 B2
(45) Date of Patent: Feb. 7, 2023

(54) CONTROLLING VAPOR COMPRESSION SYSTEM USING PROBABILISTIC SURROGATE MODEL

(71) Applicant: Mitsubishi Electric Research Laboratories, Inc., Cambridge, MA (US)

(72) Inventors: Ankush Chakrabarty, Bedford, MA (US); Christopher Laughman, Waltham, MA (US); Scott Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 25 days.

(21) Appl. No.: 17/194,299

(22) Filed: Mar. 7, 2021

(65) Prior Publication Data
US 2022/0282879 A1 Sep. 8, 2022

(51) Int. Cl.
| | |
|---|---|
| *F24F 11/46* | (2018.01) |
| *F24F 11/62* | (2018.01) |
| *F24F 11/63* | (2018.01) |
| *F24F 11/86* | (2018.01) |
| *F24F 11/65* | (2018.01) |
| *G05B 13/02* | (2006.01) |

(Continued)

(52) U.S. Cl.
CPC .............. *F24F 11/46* (2018.01); *F24F 11/62* (2018.01); *F24F 11/63* (2018.01); *F24F 11/65* (2018.01); *F24F 11/86* (2018.01); *G05B 13/0295* (2013.01); *G05B 13/042* (2013.01); *F24F 2110/10* (2018.01)

(58) Field of Classification Search
CPC .. F24F 11/46; F24F 11/62; F24F 11/63; F24F 11/65; F24F 11/86; F24F 2110/10; G05B 13/0295; G05B 13/042
USPC ......................................................... 700/276
See application file for complete search history.

(56) References Cited

U.S. PATENT DOCUMENTS

| | | |
|---|---|---|
| 10,034,417 B2 | 7/2018 | Billet et al. |
| 10,436,488 B2 | 10/2019 | Zugibe et al. |
| 10,619,879 B2 | 4/2020 | Benosman et al. |

(Continued)

FOREIGN PATENT DOCUMENTS

| | | |
|---|---|---|
| WO | 2018112352 | 6/2018 |
| WO | 20190354071 | 11/2019 |
| WO | 2020098405 | 5/2020 |

*Primary Examiner* — Jigneshkumar C Patel
(74) *Attorney, Agent, or Firm* — Gennadiy Vinokur; Hironori Tsukamoto

(57) ABSTRACT

A controller for controlling a vapor compression system is provided. The controller is configured to control an operation of the VCS with different combinations of setpoints for different actuators of the VCS to estimate a cost of operation of the VCS for each of the different combinations of setpoints, and compute, using a Bayesian optimization of the combinations of setpoints and their corresponding estimated costs of operation, a probabilistic surrogate model, wherein the probabilistic surrogate model defines at least first two order moments of the cost of operation in the probabilistic mapping. The controller is further configured to select an optimal combination of setpoints having the largest likelihood of being a global minimum at the surrogate model according to an acquisition function of the first two order moments of the cost of operation.

12 Claims, 17 Drawing Sheets

(51) Int. Cl.
  *G05B 13/04*  (2006.01)
  *F24F 110/10*  (2018.01)

(56) References Cited

U.S. PATENT DOCUMENTS

| | | | | |
|---|---|---|---|---|
| 2005/0192680 A1* | 9/2005 | Cascia | ............... | G05B 13/027 |
| | | | | 700/29 |
| 2020/0327264 A1* | 10/2020 | Wang | ..................... | G06F 7/58 |
| 2021/0181703 A1* | 6/2021 | Perez | ................. | G05B 19/054 |

* cited by examiner

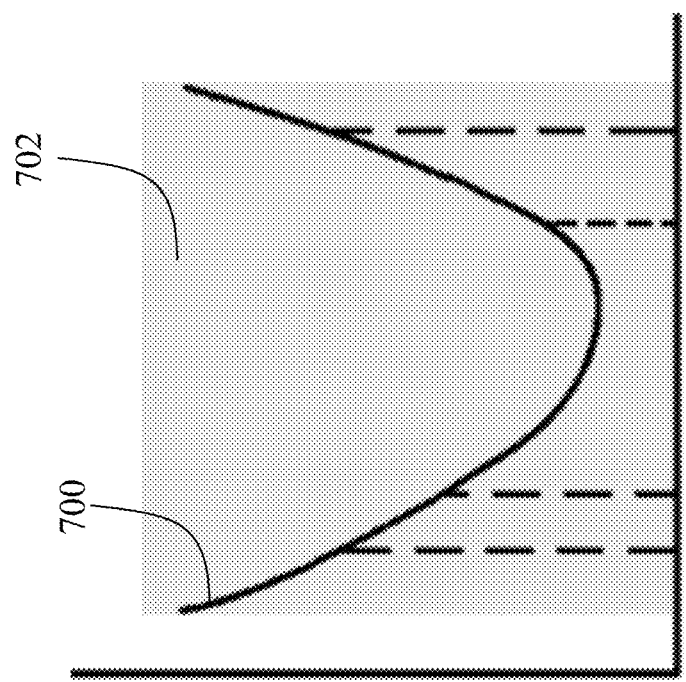

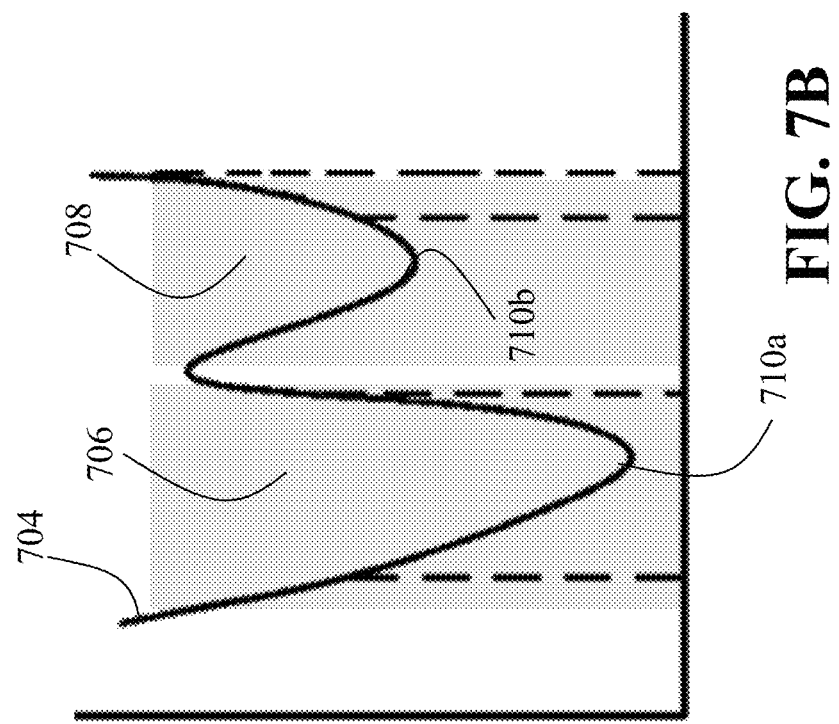

CONTROLLING VAPOR COMPRESSION SYSTEM USING PROBABILISTIC SURROGATE MODEL

TECHNICAL FIELD

The present disclosure relates generally to a vapor compression system and more particularly to an apparatus and a method for controlling an operation of the vapor compression system.

BACKGROUND

Vapor compression systems, such as heat pumps, refrigeration, and air-conditioning systems, are widely used in industrial and residential applications. The introduction of variable speed compressors, variable position valves, and variable speed fans for a vapor compression cycle has greatly improved the flexibility of operation of the vapor compression systems. The efficiency of the vapor compression systems can be improved by controlling the variable components of the vapor compression systems. In other words, control inputs can be provided to the vapor compression systems to improve efficiency. For example, the speed of the compressor can be adjusted to modulate a flow rate of a refrigerant. A speed of an evaporator fan and a condenser fan can be varied to alter heat transfer between air and heat exchangers. A change in an expansion valve opening can influence a pressure drop between a high-pressure and a low-pressure in the vapor compression system, which, in turn, affects the flow rate of the refrigerant as well as super heat temperature at a corresponding evaporator outlet.

A combination of the control inputs to the vapor compression system that delivers a particular amount of heat is often not unique and the various combinations of the control inputs consume different amounts of energy. Therefore, it is desirable to operate the vapor compression system using a combination of the control inputs that minimizes the energy and maximizes the energy efficiency of the vapor compression system.

Some approaches maximizing energy efficiency rely on the use of mathematical models of the physics of vapor compression systems. Such model-based approaches attempt to describe the influence of the control inputs of the vapor compression system on thermodynamic behavior and energy consumption of the vapor compression system. In such model-based approaches, prior analytical models are used to predict a combination of the control inputs that meets heat load requirements and minimizes the energy.

However, the use of the mathematical models for such prediction of the combination of the control inputs includes shortcomings. For example, mathematical models depend on simplifying assumptions in order to produce a mathematically tractable representation. Such assumptions ignore important effects or do not consider installation-specific characteristics such as room size, causing the mathematical models to deviate from the actual behavior of the vapor compression system. Additionally, the mathematical models are difficult to derive and calibrate. For example, parameters that describe an operation of a component of the vapor compression system, e.g., a compressor, are experimentally determined for each type of compressor used, and a mathematical model of the vapor compression system may have a number of such parameters. Thus, determining the values of the parameters for each mathematical model is a tedious process. Also, the vapor compression systems may vary over time. A mathematical model that accurately describes the operation of the vapor compression system at one time may not be accurate at a later time as the vapor compression system changes, for example, due to slowly leaking refrigerant or accumulation of corrosion on the heat exchangers.

Some approaches aim to optimize the control inputs without employing mathematical models. For example, extremum-seeking controllers (ESCs) are used to optimize the control inputs in a model-free manner. However, the ESC can take several hours to converge to optimal setpoints. Also, since disturbances acting on the vapor compression system have faster dynamics, the optimal set-points can change before the ESC converges. Such slow convergence property of the ESC represents a barrier to a solution of real-time optimization of the performance of the vapor compression systems.

Additionally, the ESC numerically constructs local gradients and chases the local gradients to a local optimum. Such a process can be slow. For instance, if control gains of the ESC are too small and an underlying function to be optimized includes small gradients, the convergence will be slow. Conversely, if the ESC control gains are too large and the underlying function is nonlinear, iterative solutions of the ESC may overshoot the optimal set-points due to large gradients. Therefore, the ESC is not compatible with non-convex problems with highly nonlinear dynamics.

To overcome the slow convergence property of the ESC, filters are used. The filters separate the effect of the phase of the transient part of a response to perturbation. However, the design of the filters is complex and requires extensive information on the vapor compression systems.

SUMMARY

It is an objective of some embodiments to provide a data-driven approach for determining an optimal combination of setpoints minimizing power consumption of the vapor compression system, without using an analytical model of underlying system dynamics. Such an objective can be realized by formulating a surrogate model. It is also an objective of some embodiments to provide a Bayesian optimization warm start method involving the surrogate model to accelerate the convergence of extremum-seeking controllers (ESCs).

The vapor compression systems (VCSs), such as heat pumps, refrigeration, and air-conditioning systems, are widely used in industrial and residential applications. The introduction of variable speed compressors, variable position valves, and variable speed fans for a vapor compression cycle has improved the flexibility of operation of the VCSs. Specifically, a combination of control inputs to the VCS that delivers a particular amount of heat is often not unique and different combinations of the control inputs can have different costs of operation. For example, the VCS operated according to two different combinations of the control inputs controlling states of actuators of the VCS can deliver the same heat capacity but can consume different amounts of energy. Therefore, it is desirable to operate the VCS using a combination of the control inputs that optimizes the cost of the operation, e.g., minimizes the energy consumption and/or maximizes the energy efficiency of the VCS.

Control methods addressing the energy efficiency of the VCSs can be divided into two categories: model-based and data-driven control methods. The model-based methods attempt to describe the influence of the control inputs of the VCS on thermodynamic behavior and the energy consumption of the VCS. In such model-based methods, prior analytical models are used to predict a combination of the control inputs that meets heat load requirements and minimizes energy consumption. However, the analytical models for different configurations of the VCSs are difficult to derive, calibrate, and update over time. For example, for a multi-zone vapor compression system (MZ-VCS) including at least a single compressor connected to multiple heat exchangers arranged in one or more indoor zones, it is difficult to formulate the analytical model. In other words, the complexity of the MZ-VCS can prevent the usage of the corresponding analytical models.

In absence of accurate models of dynamical systems (such as VCS), some control methods exploit operational data generated by the dynamical systems in real-time in order to construct control policies that stabilize the dynamics of the dynamical system. The use of the operational data to design the control policies is called data-driven control. There are two kinds of data-driven control methods: indirect methods and direct methods. The indirect methods include constructing a surrogate model of the dynamical system and leveraging the surrogate model to design controllers. The direct methods include directly constructing the control policies based on the operational data without an intermediate model-building step. A drawback of the indirect methods is the potential requirement of large quantities of data in the model-building phase. Conversely, the direct methods require fewer data, but even cutting-edge direct control methods experience difficulties in handling state and input constraints that are imperative for maintaining safe operation in closed-loop control systems such as the VCSs.

To that end, it is an object of some embodiments to provide an indirect data-driven control method for closed-loop control of the VCSs. Such a closed-loop control method may not suffer from the complexity of the model-based control methods and instability of the direct data-driven control methods. However, to provide such an indirect data-driven control, there is a need to generate a surrogate model that can govern the operations of the VCS efficiently.

Some embodiments are based on the realization that there are several obstacles in constructing such a surrogate model for controlling the VCS. For example, to construct the surrogate model, there exists a large and practically infinite continuous space of values of the control inputs to the actuators of the VCS that needs to be explored. To address this problem, some embodiments replace a surrogate model of control inputs to the actuators of VCSs with a surrogate model of setpoints for different actuators that the VCS control needs to achieve and/or track. In such a manner, optimization of controlling of the VCS is separated from actual control, which allows sampling space of the setpoints without jeopardizing continuous control of the different actuators of the VCS.

The surrogate model provides a mapping between various combinations of the setpoints for the different actuators of the VCS and their corresponding costs of operation of the VCS. As used herein, "set-point" refers to the desired value of a variable of the VCS. The term set-point is applied to any particular value of a specific set of control signals, and thermodynamic and environmental parameters. For example, the term "setpoint" may indicate a specific state or states of components of the VCS. The different actuators of the VCS may include one or more of an actuator controlling a position of an expansion valve of the VCS, an indoor fan of the VCS, an outdoor fan of the VCS, damper actuators, and the like. According to an embodiment, the cost of operation corresponding to the combination of setpoints is the power consumption of the VCS operated according to the combination of setpoints. Further, surrogate model 102 can be used to control an operation of the VCS.

Some embodiments are based on a recognition that various search techniques, such as gradient descent, can be used on the surrogate model to select an optimal combination of the setpoints reducing the cost of the operation of the VCS. However, the separation of the control from the actual VCS control creates another problem due to the slow dynamical response of the VCS. For instance, the surrogate model needs to map the setpoints to the cost of VCS operation at its steady state. However, it takes time (for example, 15 minutes) for the VCS to reach a steady-state corresponding to the setpoints. Also, when the setpoint optimization and control are separated, an additional feedback controller needs to be used to iteratively change the states of the actuators to their setpoints and after that additional time is needed to stabilize VCS output.

Therefore, the separation of the setpoints optimization from the actual VCS control creates internal problems: (1) how to estimate the cost of VCS operation in transient time without waiting for the steady-state of the VCS operation, and (2) how to reduce the number of samples of pairs of combinations of setpoints and the corresponding cost of operation needed to construct the surrogate model.

Some embodiments address these internal problems by constructing a probabilistic surrogate model using a Bayesian optimization of the combinations of the setpoints and their corresponding estimated costs of operation. The probabilistic surrogate model provides a mapping between various combinations of setpoints for the different actuators of the VCS and a probability distribution on the corresponding costs of operation. The surrogate model corresponds to the probabilistic surrogate model. The probabilistic nature of the surrogate model includes uncertainties that can be used for (1) not waiting for the steady-state of the VCS operation to estimate the cost of VCS operation because transient measurements include uncertainties that can be incorporated in the probabilistic surrogate model, and (2) guiding the surrogate model construction process in consideration of such uncertainties to reduce the number of samples needed to build the surrogate model.

According to an embodiment, the probabilistic surrogate model can be constructed using a probabilistic machine learning algorithm (such as Gaussian process regression) that maps combinations of the setpoints and the probability distribution on the corresponding estimated costs of operation, such that the probabilistic surrogate model defines at least first two order moments of the cost of operation in the probabilistic mapping. In an embodiment, the at least first two order moments may include a mean of the cost of operation and variance of the cost of operation (also referred to as confidence range). For example, for a given combination of the setpoints, the surrogate model provides not only a power consumption prediction but also a confidence range around the predicted power consumption (e.g., the power consumption prediction is 1000 W, and 95% confidence range that the predicted power consumption will be between 960 W and 1040 W).

Further, some embodiments aim to select a combination of the setpoints (also referred to as 'data point') that has to be queried next. As used herein, querying the combination of the setpoints (or the data point) refers to an evaluation of an objective with the combination of the setpoints (for example, operating the vapor compression system according to the combination of the setpoints). Some embodiments use an acquisition function of the first two order moments of the cost of operation to select the combination of the setpoints to query next.

The acquisition function uses the probabilistic mapping provided by the surrogate model to select the combination of the setpoints to query next. Therefore, the acquisition function is used as a guide to determine a data point to sample/query next. In an embodiment, the acquisition function is maximized to select an optimal combination of setpoints having the largest likelihood of being a global minimum of the surrogate model, for querying and optimizing the operation of the VCS. Such surrogate model construction and surrogate model exploitation are part of the Bayesian optimization. In other words, the Bayesian optimization includes the surrogate model using the Gaussian process regression for providing the probabilistic mapping, and the acquisition function that exploits the probabilistic mapping provided by the surrogate model to direct the querying of consequent setpoints.

The selected optimal combination of setpoints is applied to a feedback controller associated with the VCS. The feedback controller is configured to determine control commands corresponding to the selected optimal combination of set points. Further, the feedback controller controls the operation of VCS based on the control commands to change the states of the actuators of the VCS according to the selected optimal combination of setpoints. The feedback controller is one or a combination of a PI controller, a PID controller, an MPC controller, or a robust controller.

Further, the vapor compression system yields a performance output (for example, the power consumption) the selected optimal combination of set points. Further, the selected optimal combination of set points and the corresponding performance output are used to update the surrogate model using Bayesian optimization. Consequently, an updated surrogate model is obtained. Further, the same acquisition function is applied to the update surrogate model for selecting a new optimal combination of setpoints for controlling the VCS and the updating of the surrogate model. In a similar manner, the surrogate model is updated in each iteration. Such an iterative process is performed online, i.e., during real-time operation of the vapor compression system, until a termination condition is met. The termination condition may be a number of iterations. The number of iterations can be arbitrary or defined by a user. The iterative upgradation of the surrogate model yields an accurate surrogate model. Since, in each iteration, the surrogate model is updated and used accordingly in combination with the acquisition function to determine the optimal setpoints, the surrogate model in combination with the acquisition function acts as a set-point optimizer.

Some embodiments are based on a recognition that, for a non-convex function including multiple minima, if the ESC is started in a region including a local minimum, then the ESC may determine only the local minimum and not a global minimum.

Some embodiments are based on a recognition that, for the non-convex function, determining the global minimum involves identifying a good initial guess, i.e., starting the ESC in a region where the function is locally convex and includes the global minimum. Further, gradient estimates are used within the region to identify the global minimum. Without a good initial guess, gradient-based algorithms may converge slowly and may be stuck in the local minimum.

Some embodiments are based on the realization that the surrogate model can be used to start the ESC in the region that most likely contains the global minimum. In particular, a Bayesian optimization (BO) framework using the surrogate model can be formulated to start the ESC in the region that most likely contains the global minimum. A solution obtained by the BO framework can subsequently be used as an initial guess for the Adam-accelerated extremum seeking control which can be used to obtain the global minimum.

Some embodiments are based on the recognition that a gradient of the cost of operation used by the extremum seeking controller to tune the selected optimal combination of the setpoints can be easily computed when a function of the cost of operation in an analytical form is available. However, for controlling the VCSs, such an analytical function is usually unavailable. However, some embodiments are based on the realization that the probabilistic surrogate model can be used in place of such an analytical function to compute the gradient of the cost of operation based on consecutive estimations of the cost of operation for the tuned combination of setpoints. Specifically, one embodiment involves taking gradients of the kernel matrices of Gaussian processes directly with respect to each setpoint. In such a manner, the probabilistic surrogate model is used to both warm start the ESC and to control the ESC.

Surrogate modeling-based optimization (such as the Bayesian-optimization warm-started ESC) yields decisive advantages. For instance, machine learning methods enable the construction of a surrogate model of the vapor compression system's inputs to the performance outputs despite the noise in the measurements, for example, via Gaussian process regression. However, model-free approaches (such as ESC) estimate the gradients directly from noisy data which may result in undesirable effects such as oscillations in neighborhoods of optimal inputs or even divergence. Surrogate modeling also culminates in learning an input-output model upon achieving a termination criterion that can be stored, for example, on a cloud, for obtaining good initial guesses of inputs (warm-starting) in subsequent operations. Additionally, convergence rates improve with the surrogate modeling via smooth regressors, since smooth optimization methods such as first and second-order methods can be used directly on the surrogate model.

Accordingly, one embodiment discloses a controller for controlling an operation of a vapor compression system (VCS). The controller comprises at least one processor; and memory having instructions stored thereon that, when executed by the at least one processor, cause the controller to: control the operation of the VCS with different combinations of setpoints for different actuators of the VCS to estimate a cost of operation of the VCS for each of the different combinations of setpoints; compute, using a Bayesian optimization of the combinations of setpoints and their corresponding estimated costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping; select an optimal combination of setpoints having the largest likelihood of being a global minimum at the surrogate model according to an acquisition function of the first two order moments of the cost of operation; and submit the selected optimal combination of the setpoints to a feedback controller to change states of the actuators of the VCS according to their corresponding setpoints in the selected optimal combination.

Another embodiment discloses a method for controlling an operation of a vapor compression system (VCS). The method comprises controlling the operation of the VCS with different combinations of setpoints for different actuators of the VCS to estimate a cost of operation of the VCS for each of the different combinations of setpoints; computing, using a Bayesian optimization of the combinations of setpoints and their corresponding estimated costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping; selecting an optimal combination of setpoints having the largest likelihood of being a global minimum at the surrogate model according to an acquisition function of the first two order moments of the cost of operation; and submitting the selected optimal combination of the setpoints to a feedback controller to change states of the actuators of the VCS according to their corresponding setpoints in the selected optimal combination.

Yet another embodiment discloses a non-transitory computer readable storage medium embodied thereon a program executable by a processor for performing a method for controlling an operation of a vapor compression system (VCS). The method comprises controlling the operation of the VCS with different combinations of setpoints for different actuators of the VCS to estimate a cost of operation of the VCS for each of the different combinations of setpoints; computing, using a Bayesian optimization of the combinations of setpoints and their corresponding estimated costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping; selecting an optimal combination of setpoints having the largest likelihood of being a global minimum at the surrogate model according to an acquisition function of the first two order moments of the cost of operation; and submitting the selected optimal combination of the setpoints to a feedback controller to change states of the actuators of the VCS according to their corresponding setpoints in the selected optimal combination.

BRIEF DESCRIPTION OF THE DRAWINGS

FIG. 7A shows an exemplary convex function, according to some embodiments.

FIG. 7B shows an exemplary non-convex function, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. The term "based on" means at least partially based on. Further, it is to be understood that the phraseology and terminology employed herein are for the purpose of description and should not be regarded as limiting unless specifically defined as a limitation. Any heading utilized within this description is for convenience only and has no legal or limiting effect.

Figure 1A:
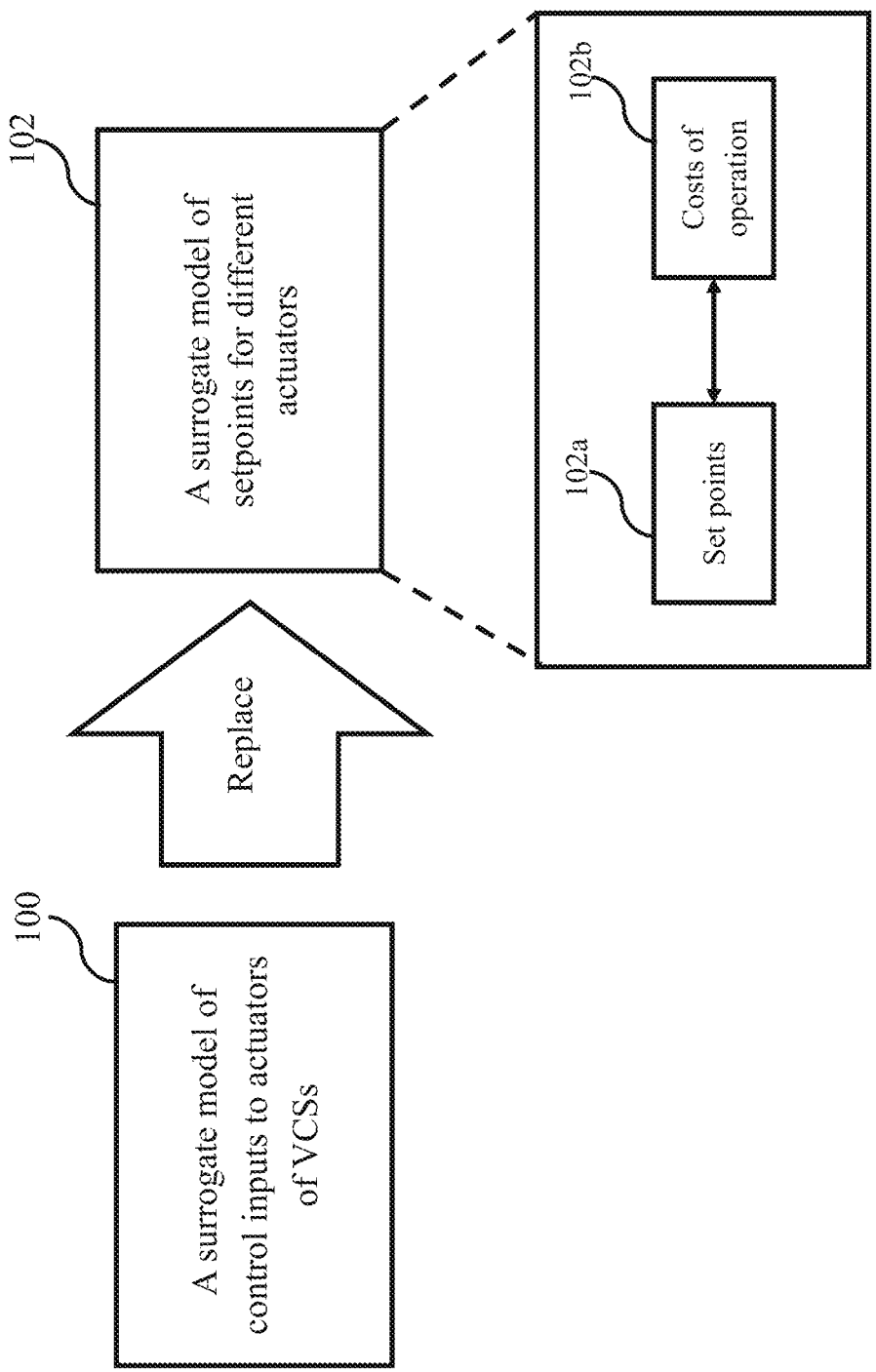
FIG. 1A shows a schematic of principles employed by some embodiments for separation of control of a vapor compression system.

FIG. 1A shows a schematic of principles employed by some embodiments for separation of control of a vapor compression system. The vapor compression systems (VCSs), such as heat pumps, refrigeration, and air-conditioning systems, are widely used in industrial and residential applications. The introduction of variable speed compressors, variable position valves, and variable speed fans for a vapor compression cycle has improved the flexibility of operation of the VCSs. Specifically, a combination of control inputs to the VCS that delivers a particular amount of heat is often not unique and different combinations of the control inputs can have different costs of operation. For example, the VCS operated according to two different combinations of the control inputs controlling states of actuators of the VCS can deliver the same heat capacity but can consume different amounts of energy. Therefore, it is desirable to operate the VCS using a combination of the control inputs that optimizes the cost of the operation, e.g., minimizes the energy consumption and/or maximizes the energy efficiency of the VCS.

Control methods addressing the energy efficiency of the VCSs can be divided into two categories: model-based and data-driven control methods. The model-based methods attempt to describe the influence of the control inputs of the VCS on thermodynamic behavior and the energy consumption of the VCS. In such model-based methods, prior analytical models are used to predict a combination of the control inputs that meets heat load requirements and minimizes energy consumption. However, the analytical models for different configurations of the VCSs are difficult to derive, calibrate, and update over time. For example, for a multi-zone vapor compression system (MZ-VCS) including at least a single compressor connected to multiple heat exchangers arranged in one or more indoor zones, it is difficult to formulate the analytical model. In other words, the complexity of the MZ-VCS can prevent the usage of the corresponding analytical models.

In absence of accurate models of dynamical systems (such as VCS), some control methods exploit operational data generated by the dynamical systems in real-time in order to construct control policies that stabilize the dynamics of the dynamical system. The use of the operational data to design the control policies is called data-driven control. There are two kinds of data-driven control methods: indirect methods and direct methods. The indirect methods include constructing a surrogate model of the dynamical system and leveraging the surrogate model to design controllers. The direct methods include directly constructing the control policies based on the operational data without an intermediate model-building step. A drawback of the indirect methods is the potential requirement of large quantities of data in the model-building phase. Conversely, the direct methods require fewer data, but even cutting-edge direct control methods experience difficulties in handling state and input constraints that are imperative for maintaining safe operation in closed-loop control systems such as the VCSs.

To that end, it is an object of some embodiments to provide an indirect data-driven control method for closed-loop control of the VCSs. Such a closed-loop control method may not suffer from the complexity of the model-based control methods and instability of the direct data-driven control methods. However, to provide such an indirect data-driven control, there is a need to generate a surrogate model that can govern the operations of the VCS efficiently.

Some embodiments are based on the realization that there are several obstacles in constructing such a surrogate model for controlling the VCS. For example, to construct the surrogate model, there exists a large and practically infinite continuous space of values of the control inputs to the actuators of the VCS that needs to be explored. To address this problem, some embodiments replace a surrogate model 110 of control inputs to the actuators of VCSs with a surrogate model 102 of setpoints for different actuators that the VCS control needs to achieve and/or track. In such a manner, optimization of controlling of the VCS is separated from actual control, which allows sampling space of the setpoints without jeopardizing continuous control of the different actuators of the VCS.

The surrogate model 102 provides a mapping between various combinations of the setpoints 102a for the different actuators of the VCS and their corresponding costs of operation 102b of the VCS. As used herein, "set-point" refers to a desired value of a variable of the VCS. The term set-point is applied to any particular value of a specific set of control signals, and thermodynamic and environmental parameters. For example, the term "setpoint" may indicate a specific state or states of components of the VCS. The different actuators of the VCS may include one or more of an actuator controlling a position of an expansion valve of the VCS, an indoor fan of the VCS, an outdoor fan of the VCS, damper actuators, and the like. According to an embodiment, the cost of operation corresponding to the combination of setpoints is the power consumption of the VCS operated according to the combination of setpoints. Further, surrogate model 102 can be used to control an operation of the VCS.

Figure 1B:
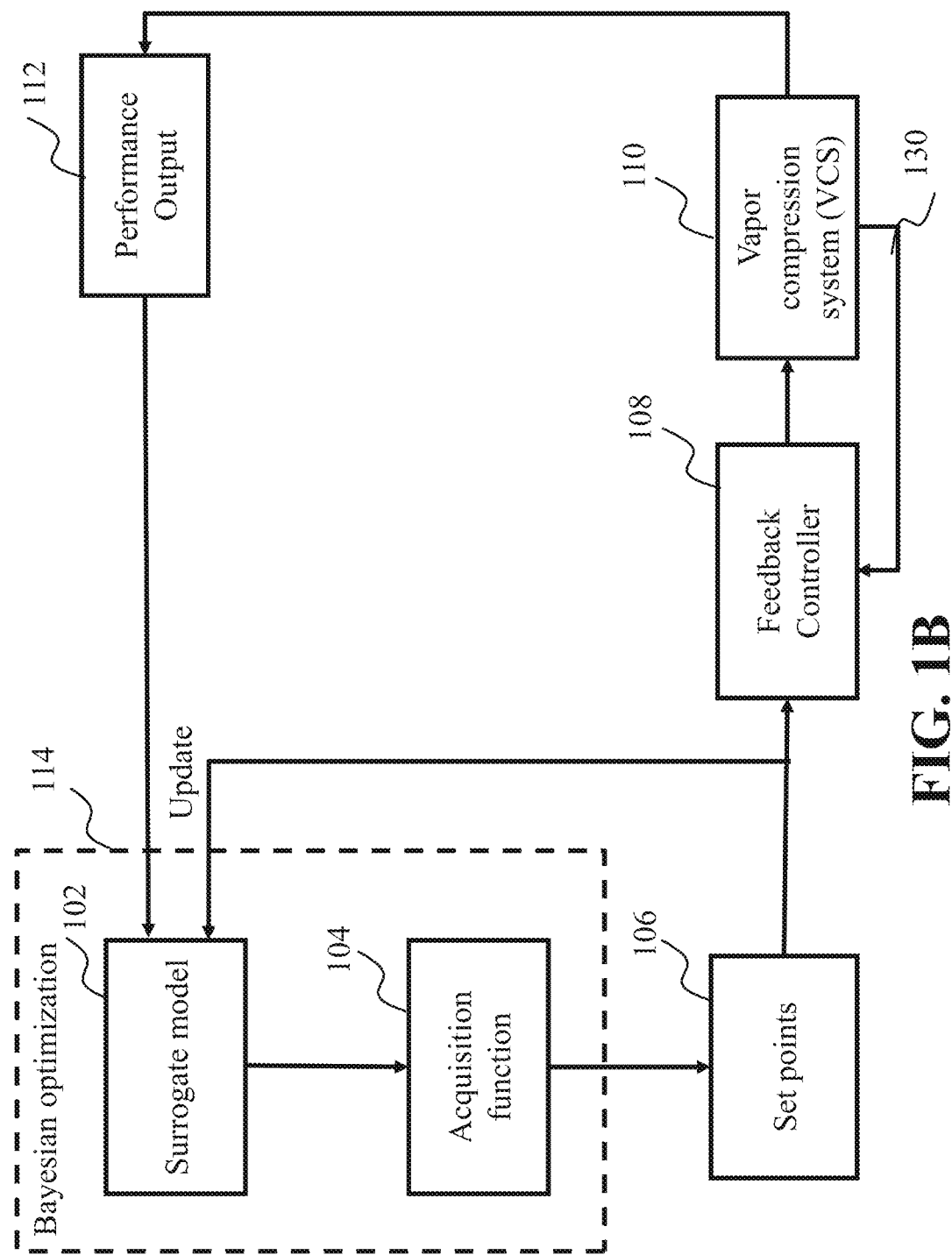
FIG. 1B shows a schematic of principles employed by some embodiments for controlling an operation of the vapor compression system.

FIG. 1B shows a schematic of principles employed by some embodiments for controlling the operation of a vapor compression system 110 (VCS), using the surrogate model 102. Some embodiments are based on a recognition that various search techniques, such as gradient descent, can be used on the surrogate model 102 to select an optimal combination of the setpoints reducing the cost of the operation of the VCS 110. However, the separation of the control from the actual VCS control creates another problem due to the slow dynamical response of the VCS 110. For instance, surrogate model 102 needs to map the setpoints to the cost of VCS operation at its steady state. However, it takes time (for example, 15 minutes) for the VCS 110 to reach a steady state corresponding to the setpoints. Also, when the setpoint optimization and control are separated, an additional feedback controller needs to be used to iteratively change the states of the actuators to their setpoints and after that additional time is needed to stabilize VCS output.

Therefore, the separation of the setpoints optimization from the actual VCS control creates internal problems. i.e., a lot of time is consumed in waiting for the steady-state of the VCS operation, and a large number of samples of pairs of combinations of the setpoints and the corresponding cost of operation are needed to construct the surrogate model 102. To that end, it is an objective of some embodiments to estimate the cost of VCS operation in transient time without waiting for the steady-state of the VCS operation, and also reduce the number of samples needed to construct the surrogate model 102.

According to an embodiment, such an objective can be achieved by constructing a probabilistic surrogate model using a Bayesian optimization of the combinations of the setpoints and their corresponding estimated costs of operation. The probabilistic surrogate model provides a mapping between various combinations of setpoints for the different actuators of the VCS 110 and a probability distribution on the corresponding costs of operation. The surrogate model 102 corresponds to the probabilistic surrogate model. The probabilistic nature of the surrogate model 102 includes uncertainties that can be used for (1) not waiting for the steady-state of the VCS operation to estimate the cost of VCS operation because transient measurements include uncertainties that can be incorporated in the probabilistic surrogate model, and (2) guiding the surrogate model construction process in consideration of such uncertainties to reduce the number of samples needed to build the surrogate model 102.

In an embodiment, the cost of operation for a combination of the setpoints is estimated after the VCS 110 is operated according to the combination of setpoints for a predetermined time (for example, five minutes) insufficient for the VCS 110 to reach the steady-state. In some embodiments, at least some costs of operation are estimated during a transient state of the VCS 110 operated according to the corresponding combination of the setpoints.

According to an embodiment, the probabilistic surrogate model can be constructed using a probabilistic machine learning algorithm (such as Gaussian process regression) that maps combinations of the setpoints and the probability distribution on the corresponding estimated costs of operation, such that the probabilistic surrogate model defines at least first two order moments of the cost of operation in the probabilistic mapping. In an embodiment, the at least first two order moments may include a mean of the cost of operation and a variance of the cost of operation (also referred to as confidence range). For example, for a given combination of the setpoints, the surrogate model 102 provides not only power consumption prediction but also a confidence range around the predicted power consumption (e.g., the power consumption prediction is 1000 W, and 95% confidence range that the predicted power consumption will be between 960 W and 1040 W).

Figure 1C:
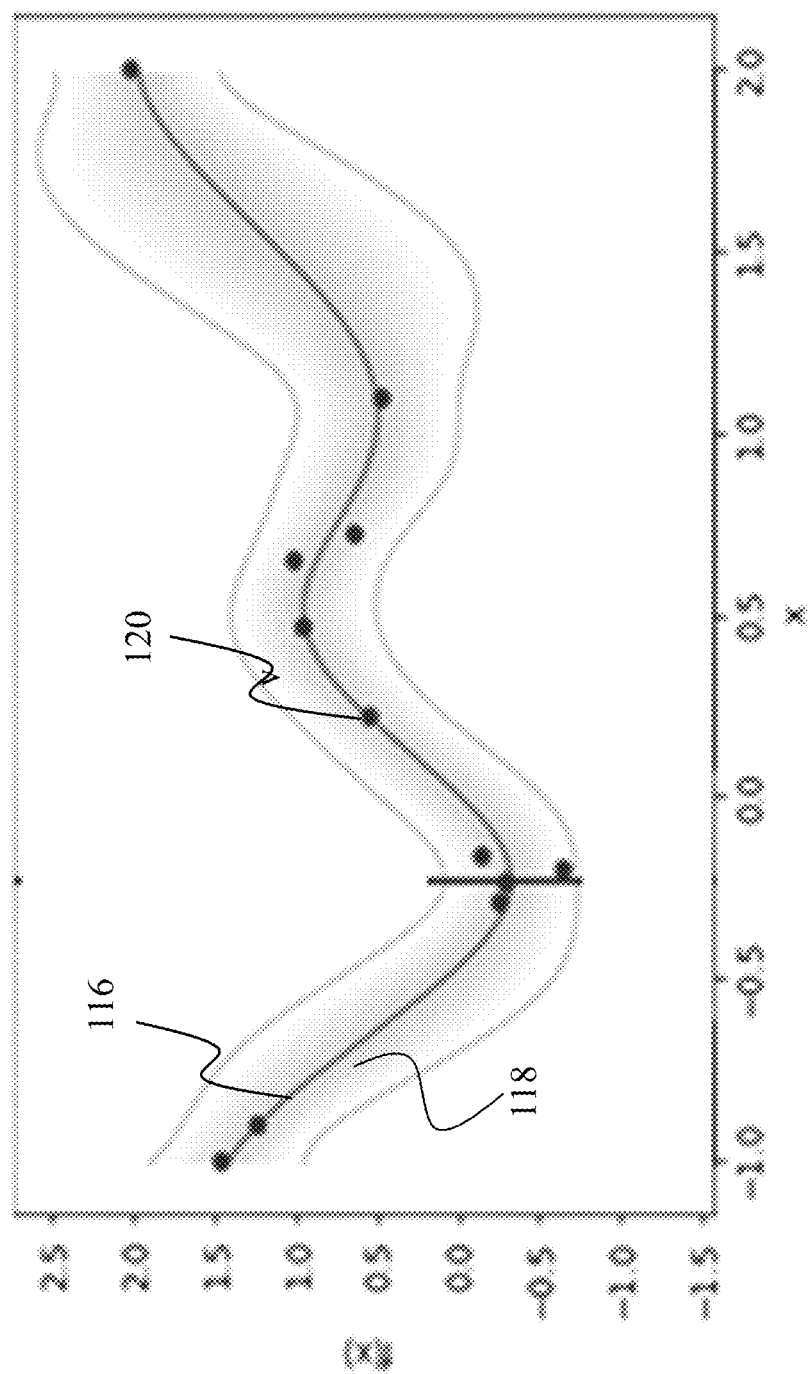
FIG. 1C illustrates a mean prediction and a confidence range provided by a surrogate model, according to some embodiments.

FIG. 1C illustrates a mean prediction and the confidence range provided by the surrogate model 102, according to some embodiments. Dots 120 represent samples/observations. A curve 116 represents the mean prediction and shaded area 118 represents the confidence range.

Further, some embodiments aim to select a combination of the setpoints (also referred to as 'data point') that has to be queried next. As used herein, querying the combination of the setpoints (or the data point) refers to an evaluation of an objective with the combination of the setpoints (for example, operating the vapor compression system 110 according to the combination of the setpoints). Some embodiments use an acquisition function 104 of the first two order moments of the cost of operation to select the combination of the setpoints to query next.

Figure 1D:
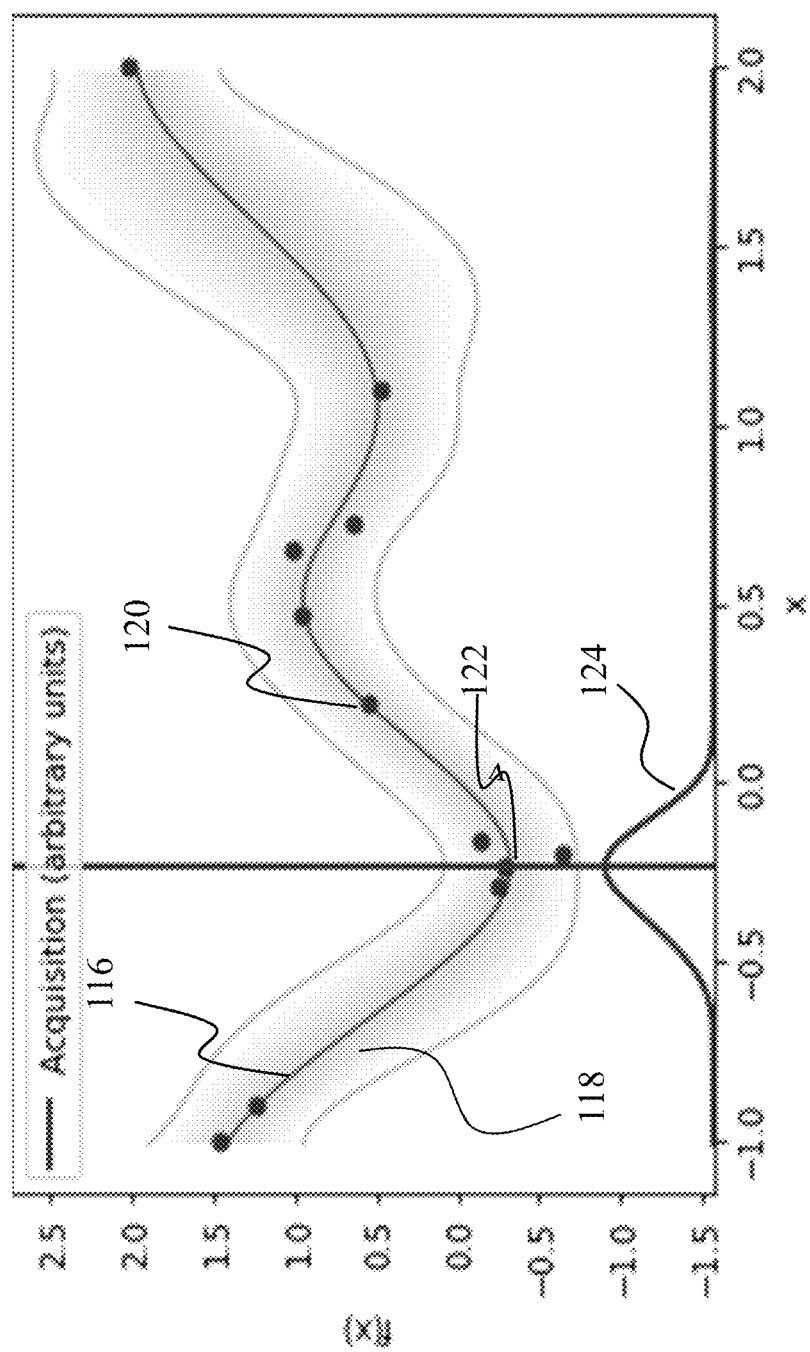
FIG. 1D shows a curve of an acquisition function, according to some embodiments.

FIG. 1D shows a curve 124 of the acquisition function 104, according to some embodiments. The acquisition function 104 uses the probabilistic mapping provided by the surrogate model 102 to select the combination of the setpoints (i.e., the data point) to query next. For example, if at a first data point (that has not been queried before), the surrogate model 102 yields that the power consumption may be at least 900 W with 85% confidence range, and at a second data point (that has also not been queried before), the surrogate model 102 yields that the power consumption may be at least 990 W with 95% confidence range, then the first data point needs to be queried before querying the second data point even though the first data point has low confidence range because 900 W is more likely optimal power consumption of the vapor compression system 110. Therefore, the acquisition function 104 is used as a guide to determine a data point to sample/query next.

In an embodiment, the acquisition function 104 is maximized to select an optimal combination of setpoints 106 having the largest likelihood of being a global minimum 122 of the surrogate model 102, for querying and optimizing the operation of the VCS 110. Such surrogate model construction and surrogate model exploitation are part of the Bayesian optimization 114. In other words, the Bayesian optimization 114 includes the surrogate model 102 using the Gaussian process regression for providing the probabilistic mapping, and the acquisition function 104 that exploits the probabilistic mapping provided by the surrogate model 102 to direct the querying of consequent setpoints.

The selected optimal combination of set points 106 is applied to a feedback controller 108 associated with the VCS 110. The feedback controller 108 is configured to determine control commands corresponding to the selected optimal combination of set points 106. Further, the feedback controller 108 controls the operation of VCS 110 based on the control commands to change the states of the actuators of the VCS 110 according to the selected optimal combination of setpoints 106. Specifically, in an embodiment, the feedback controller 108 measures the output of the VCS 110 (or a process variable). The measured value is applied as feedback signal 130 to the feedback controller 108. The feedback controller 108 computes an error signal as a difference between the selected optimal combination of set points 106 and the feedback signal 130. The feedback controller 108 uses control parameters such as a proportional gain, an integral term, and/or a derivative term. The control parameters may be applied to the error signal to determine an input for the VCS 110 to drive the process variable or the VCS output according to the selected optimal combination of set points 106. The feedback controller 110 is one or a combination of a PI controller, a PID controller, an MPC controller, or a robust controller.

Further, the vapor compression system 110 yields a performance output 112 (for example, the power consumption) the selected optimal combination of set points 106. Further, the selected optimal combination of set points 106.106 and the corresponding performance output 112 are used to update the surrogate model 102 using the Bayesian optimization. Consequently, an updated surrogate model is obtained. Further, the same acquisition function 104 is applied to the update surrogate model for selecting a new optimal combination of setpoints for controlling the VCS 110 and the updating of the surrogate model 120. In a similar manner, surrogate model 102 is updated in each iteration. Such an iterative process is performed online, i.e., during real-time operation of the vapor compression system 110, until a termination condition is met. The termination condition may be a number of iterations. The number of iterations can be arbitrary or defined by a user.

The iterative upgradation of the surrogate model 102 yields an accurate surrogate model. Since in each iteration, the surrogate model 102 is updated and used accordingly in combination with the acquisition function 104 to determine the optimal setpoints, the surrogate model 102 in combination with the acquisition function 104 acts as a set-point optimizer.

Figure 2:
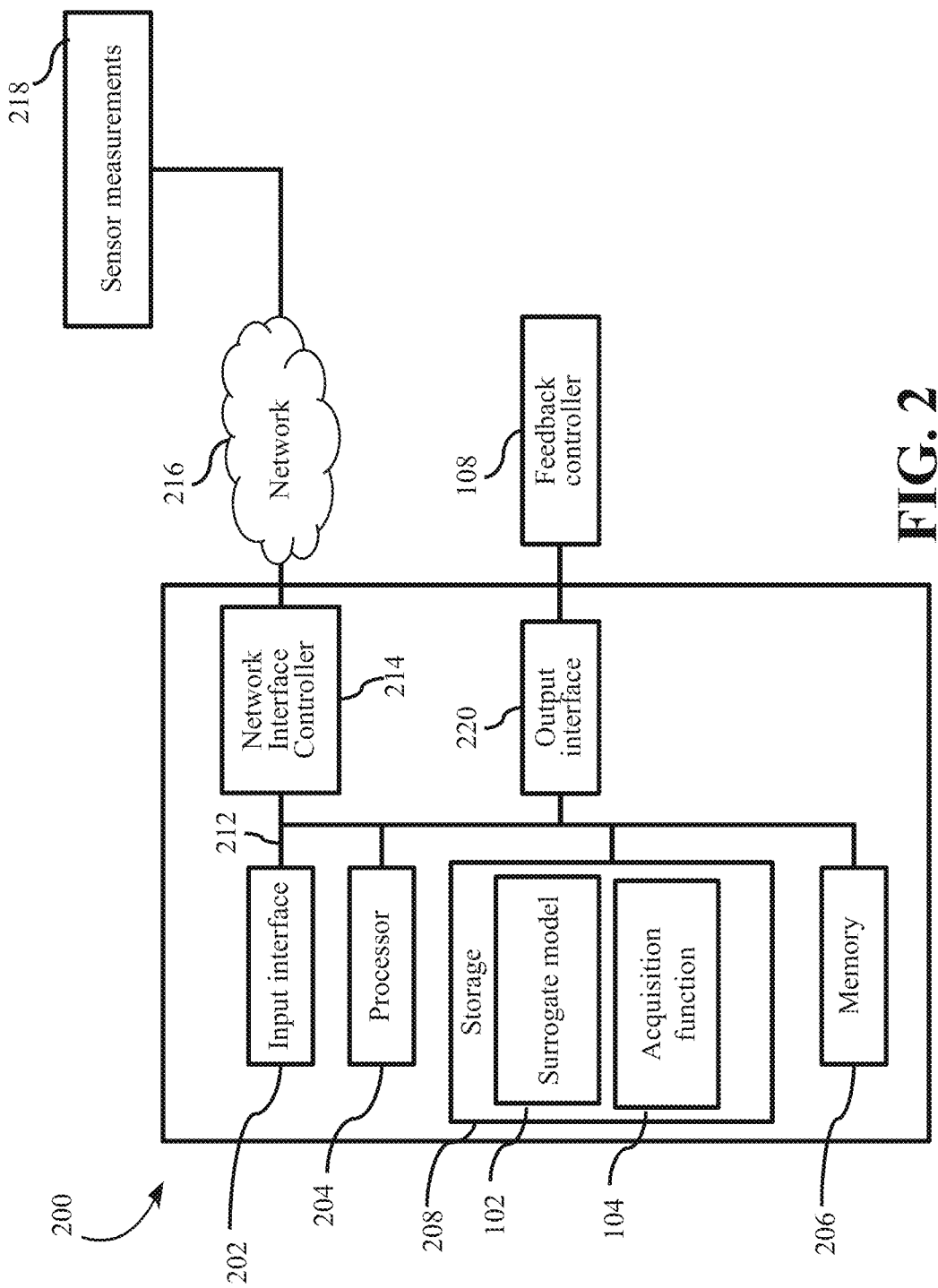
FIG. 2 shows a block diagram of a controlling device for controlling the operation of the vapor compression system, according to some embodiments.

FIG. 2 shows a block diagram of a controlling device 200 for controlling the operation of the vapor compression system 110, according to some embodiments. The controlling device 200 can have a number of interfaces connecting the controlling device 200 with other systems and devices. For example, a network interface controller (NIC) 214 is adapted to connect the controlling device 200, through a bus 212, to a network 216. Through the network 216, either wirelessly or through wires, the controlling device 200 may receive sensor measurements 218 indicative of one or more of a speed of the indoor fan, a speed of the outdoor fan, the position of the expansion valve, a speed of the compressor, the performance output 112 the vapor compression system 110, and the like. Additionally or alternatively, the sensor measurements 218 may be received via an input interface 202. The controlling device 200 may monitor the operation of the components of the vapor compression system 110 based on the sensor measurements.

The controlling device 200 includes a processor 204 configured to execute stored instructions, as well as a memory 206 that stores instructions that are executable by the processor 204. The processor 204 can be a single-core processor, a multi-core processor, a computing cluster, or any number of other configurations. The memory 206 can include random access memory (RAM), read-only memory (ROM), flash memory, or any other suitable memory system.

The processor 204 is connected through bus 212 to one or more input and output devices. Further, the controlling device 200 includes a storage device 208 adapted to store different modules storing executable instructions for the processor 204. The storage device 208 can be implemented using a hard drive, an optical drive, a thumb drive, an array of drives, or any combinations thereof.

The storage device 208 is configured to store a surrogate model 102 providing a probabilistic mapping between various combinations of setpoints for different actuators of the VCS and their corresponding costs of operation. The storage device 208 is configured to store an acquisition function 104. The acquisition function 104 is used to select a combination of different parameters of the operation of the vapor compression system 110 to query/sample next. In some embodiments, the acquisition function 104 is used to select an optimal combination of setpoints having the largest likelihood of being a global minimum at the surrogate model 102.

In some embodiments, the processor 204 is configured to control the operation of the VCS 110 with different combinations of setpoints for the different actuators of the VCS 110 to estimate a cost of operation of the VCS 110 or each of the different combinations of setpoints, and compute, using the Bayesian optimization of the combinations of setpoints and their corresponding estimated costs of operation, the probabilistic surrogate model providing the probabilistic mapping between various combinations of setpoints for different actuators of the VCS 110 and their corresponding costs of operation, wherein the probabilistic surrogate model defines the 'at least first two order moments of the cost of operation in the probabilistic mapping. The processor 204 is further configured to select the optimal combination of setpoints having the largest likelihood of being a global minimum at the surrogate model according to the acquisition function 104 of the first two order moments of the cost of operation. The processor 204 is further configured to submit, via an output interface 220, the selected optimal combination of the setpoints to the feedback controller 108 to change states of the actuators of the VCS 110 according to their corresponding setpoints in the selected optimal combination. The feedback controller 108 is one or a combination of a PI controller, a PID controller, an MPC controller, or a robust controller.

In an embodiment, the processor 204 is further configured to estimate the cost of operation for the selected optimal combination of setpoints 106 and uses the selected optimal combination of setpoints and the corresponding estimated cost of operation to update the surrogate model 102 using the Bayesian optimization. In some embodiments, the processor 204 is further configured to update the surrogate model 102 recursively with the newly selected optimal combination of setpoints according to the acquisition function applied to the updated surrogate model until the termination condition is met.

Figure 3:
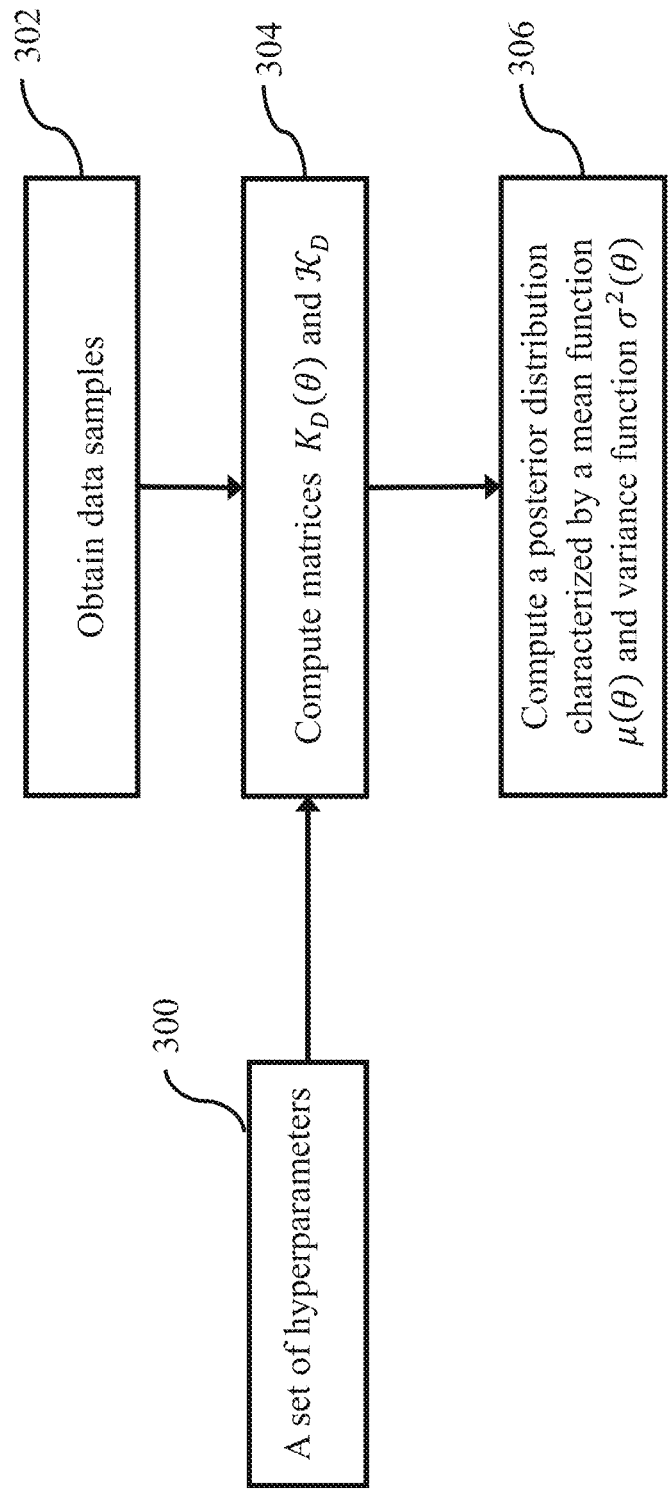
FIG. 3 shows a block diagram of Gaussian process for determining the surrogate model, according to some embodiments.

FIG. 3 shows a block diagram of the Gaussian process for determining the surrogate model 102, according to some embodiments. According to an embodiment, the Gaussian processes are used to define a prior distribution over functions. It is assumed that a steady-state power cost function J to be optimized is generated from such a prior distribution, characterized by a zero mean and a kernelized covariance function $\mathcal{K}(\theta, \theta')$. The kernelized covariance function $\mathcal{K}$ is responsible for defining characteristics of the function J such as smoothness, robustness to additive noise, and the like. Some embodiments are based on a recognition that it is beneficial to use Matern 3/2 function, as Matern 3/2 function provides a good approximation of steady-state power functions without over smoothing.

At block 302, data samples are obtained. To that end, a user may select an expansion valve position (e.g., 150 counts), the speed of the indoor unit fan (e.g., 300 rpm), and the speed of the outdoor unit fan (e.g., 750 rpm). Further, the vapor compression system 110 is operated according to the selected values of the vapor compression system 110 parameters for a few minutes (e.g., 5 minutes) to compute the steady-state power consumption. Such a process constitutes obtaining a data sample from the vapor compression system 110, given a set of parameters (150 counts, 300 rpm, and 750 rpm). For instance, five such data samples (at 5 mins per evaluation) are obtained. Let $N_\theta$ denote a number of the data samples. The data samples are denoted by $$\{\theta_k^D, J(\theta_k^D)+v_k\}_{\{k=1\}}^{N_\theta}$$

where v is additive white noise in a measurement channel with zero-mean and unknown covariance.

At block 304, given a set of hyperparameters 300 l and $\sigma_0$ for a pre-decided kernel, matrices $K_D(\theta)$ and $\mathcal{K}_D$ are computed as $$K_D(\theta) = [\mathcal{K}(\theta, \theta_1^D) \ldots \mathcal{K}(\theta, \theta_N^D)]$$

and $$\mathcal{K}_D = \begin{bmatrix} \mathcal{K}(\theta_1^D, \theta_1^D) & \ldots & \mathcal{K}(\theta_1^D, \theta_N^D) \\ \vdots & \ddots & \vdots \\ \mathcal{K}(\theta_N^D, \theta_1^D) & \ldots & \mathcal{K}(\theta_N^D, \theta_N^D) \end{bmatrix}.$$

At block 306, based on the computed matrices $K_D(\theta)$ and $\mathcal{K}_D$, a posterior distribution characterized by a mean function $\mu(\theta)$ and variance function $\sigma^2(\theta)$ is computed. The mean function $\mu(\theta)$ and the variance function $\sigma^2(\theta)$ are given by $$\mu(\theta) = K_D(\theta)^T (\mathcal{K} + \sigma_n^2 I)^{-1} (J(\theta)+v), \quad (1)$$

$$\theta^2(\theta) = \mathcal{K}(\theta,\theta) - K_D(\theta)^T (\mathcal{K}_D + \sigma_n^2 I)^{-1} K_D(\theta) \quad (2)$$

According to an embodiment, the mean function $\mu(\theta)$ and the variance function $\sigma^2(\theta)$ define the surrogate model 102. It can be noted from equations (1) and (2) that the posterior distribution is dependent on selection of the kernel and the set of hyperparameters 300 such as l, $\sigma_0$ and $\sigma_n$.

In an embodiment, the set of hyperparameters 300 are determined by maximizing a log-marginal likelihood function $$\mathcal{L}(\sigma_0, \sigma_n, l) = -\frac{1}{2}\log|\mathcal{K}_n| - \frac{1}{2}\xi^T \mathcal{K}_n \xi + \frac{p}{2}\log 2\pi, \quad (3)$$

with $\mathcal{K}_n = \mathcal{K}_D + \sigma_n^2 I$ and $\xi = J(\theta)+v$. The problem given by equation (3) can be solved using quasi-Newton methods. In an alternate embodiment, the problem given by equation (3) can be solved using adaptive gradient methods.

Alternatively, in some embodiments, the surrogate model 102 can be determined by neural process regression or Bayesian neural networks and/or other variants of machine learning.

Figure 4:
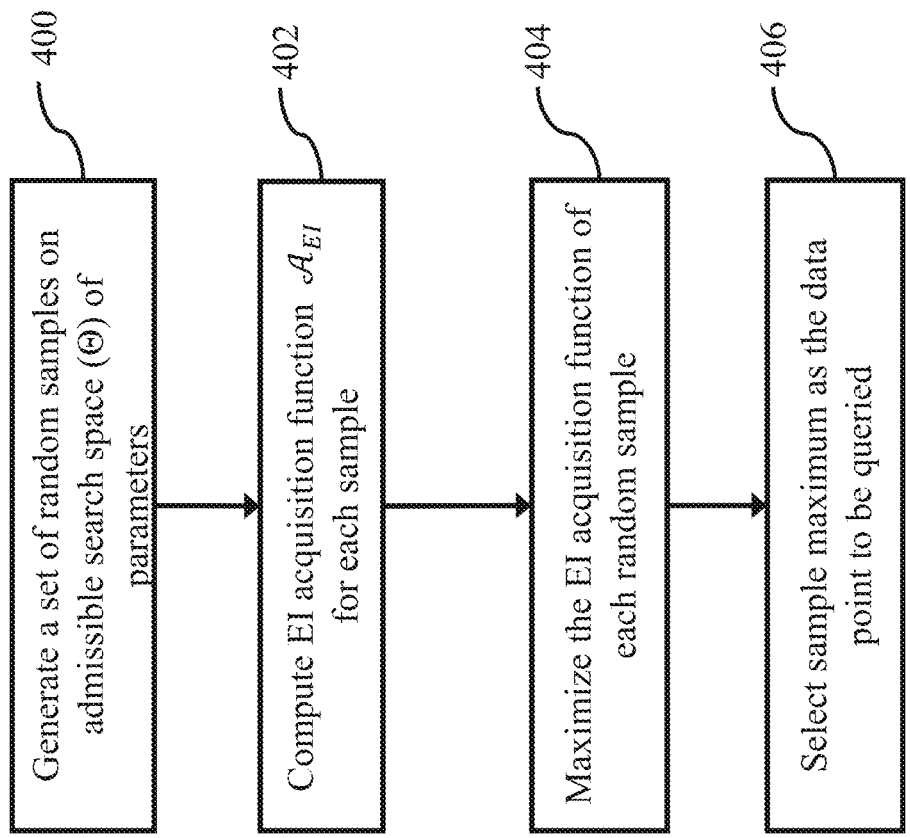
FIG. 4 shows a block diagram for selecting a data point to query next, according to some embodiments.

FIG. 4 shows a block diagram for selecting the data point (i.e., a combination of the parameters) to query next, according to some embodiments. The acquisition function 104 uses the surrogate model 102 to compute the data-point that has to be queried. The data-point that has to be queried is given by $$\theta_{N_\theta+1} := \arg\max \mathcal{A}(\theta), \quad (4)$$

As the equation (4) depends on the Gaussian process approximated function and not on the actual function J, maximization of the acquisition function $\mathcal{A}$ involves computing rather than expensive function evaluations. In an embodiment, the acquisition function $\mathcal{A}$ is an expected improvement (EI) acquisition function. The EI acquisition function is given by $$\mathcal{A}_{EI}(\theta) = \sigma(\theta)(\gamma(\theta)\Phi(\gamma(\theta)) + \phi(\gamma(\theta))) \quad (5)$$

where $\phi$ is a density function of a zero-mean one-variance normal distribution, $\Phi$ is a cumulative distribution function, and $$\gamma(\theta) = \frac{J_{best} - \mu(\theta)}{\sigma(\theta)}$$

where $J_{best}$ is the lowest steady-state power measured so far with the data samples $\{\theta_k\}_{\{k=1\}}^{N_\theta}$.

According to an embodiment, the maximization of the EI acquisition function (5) is carried out to compute the data point to be queried. At block 400, a set of random samples on admissible search space ($\Theta$) of the parameters are generated.

Further, at block 402, the EI acquisition function $\mathcal{A}_{EI}$ is computed for each sample.

At block 404, maximization of the EI acquisition function of each random sample is carried out. At block 406, sample maximum is selected as the data point to be queried.

To that end, the acquisition function (for e.g., equation (5)) provides the data point to query. After querying at the selected data point, a corresponding steady-state power is obtained. Some embodiments are based on a recognition that the data point determined from the acquisition function can be used to update/retrain the surrogate model 102 to increase the accuracy of the surrogate model 102. In particular, with the data samples and the data point selected using the acquisition function, the set of hyperparameters is re-computed.

Similarly, in the next iteration, with the updated/retrained surrogate model 102, the acquisition function (for e.g., equation (5)) can be used to select another data point to be queried. Further, the other data point selected can be used to again update/retrain the updated/retrained surrogate model 102. Such iterations of updating the surrogate model 102 are carried out until the termination condition is met. After a suitable number of iterations, surrogate model 102 learns the underlying function J.

Alternatively, in some implementations, the probability of improvement acquisition function, or upper confidence bound acquisition function can be used to select the data point to query next.

Step Size Adjustment Based on Gradient Estimates

According to an embodiment, a closed-loop vapor compression system (such as vapor compression system 110) can be modeled by dynamics $$x_{t+1} = f(x_t, \theta_t),$$

where t denotes a time index, $x \in \mathbb{R}^n$ denotes a state of the vapor compression system, and $\theta \in \Theta$ denotes a vector of set-points that can be designed to drive the vapor compression system to an equilibrium where a measured steady-state power output $$y_t = J(\theta_t) := \tilde{J}(\pi_\infty(\theta_t))$$

attains its minimum. For example, $\theta$ can be a position of an electronically actuated valve, or fan speeds, and combinations thereof. It is assumed that the function J is convex on a set of parameters of admissible search space $\Theta$ and admits an optimum. That is, there exists a $\theta^* \in \Theta$ such that $\nabla J(\theta^*) = 0$, and there exists a $\chi > 0$ such that $\nabla^2 J(\theta) \succcurlyeq \chi I$ for every $\theta \in \Theta$. Here, $\Theta \subset \mathbb{R}^p$ denotes a known admissible set of parameters; for example, a range of fan speeds. The non-linearity f is assumed to be twice continuously differentiable but is not required to be known. The measured steady-state power output $y \in \mathbb{R}^p$ denotes a steady-state power output of the vapor compression system, and $\pi_\infty(\bullet)$ is a mapping from set-points to equilibrium states; that is $f(\pi_\infty(\theta), \theta) = 0$. It is an object of some embodiments to drive $\theta_t \to \theta^*$ (optimal set-point).

Some embodiments are based on a recognition that adaptive gradient algorithms, such as Adam, stochastic gradient descent, adaptive gradient (Adagrad), and RMSprop, leverage not only gradient but also corresponding statistics leading to robust estimates of the gradient. Also, the adaptive gradient algorithms include momentum-based mechanisms to quickly identify step-sizes to improve convergence speed. The adaptive gradient algorithms are typically used for training neural networks. However, some embodiments are based on the realization that the adaptive gradient algorithms can be used in an extremum seeking control (ESC) to automatically adapt step-size based on the smoothness of the function J in a local neighborhood. To that end, one embodiment aims to adopt Adam algorithm to the extremum seeking control to formulate an Adam-accelerated extremum seeking control.

Figure 5:
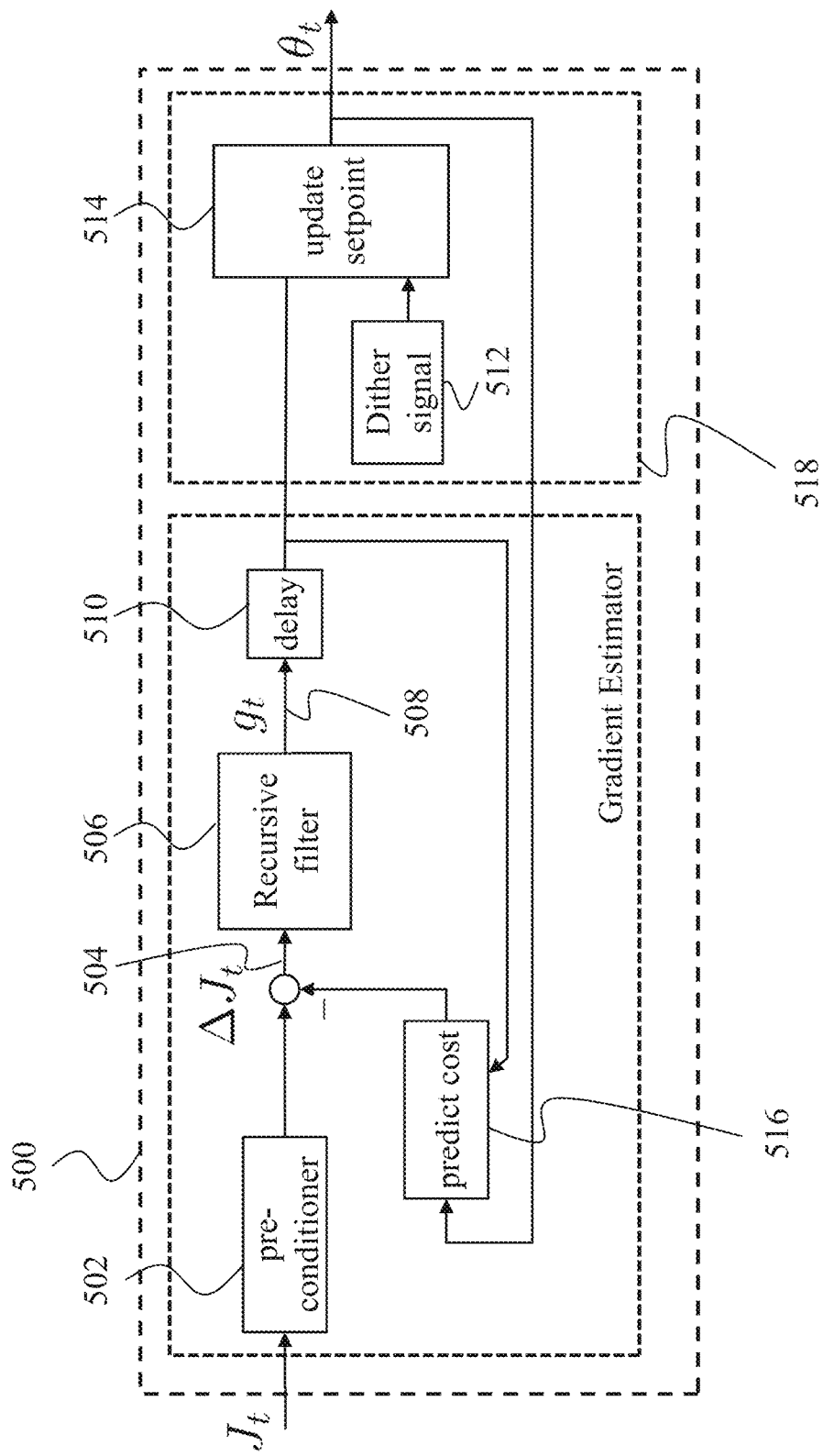
FIG. 5 shows a schematic of a time varying extremum seeking controller (TV-ESC) using principles of Adam algorithm, according to some embodiments.

FIG. 5 shows a schematic of a time-varying extremum seeking controller (TV-ESC) using principles of the Adam algorithm, according to some embodiments. The processor 204 executes the TV-ESC. The TV-ESC perturbs an input to the feedback controller 108 starting from the selected optimal combination of the setpoints 106 to tune the selected optimal combination of the setpoints based on a gradient of the cost of operation caused by the perturbation. The TV-ESC includes a gradient-based controller 500 that has the form $$\theta_{t+1} = \theta_t - k_g g_t + d_t,$$

where $g_t$ is an estimate of the gradient of $J(\theta_t)$, a scalar $k_g$ is a control gain or step size, and $d_t$ is a bounded dither signal 512 required to ensure persistence of excitation.

Some embodiments are based on the recognition that the gradient $g_t$ of the cost of operation $J(\theta_t)$ used by the extremum-seeking controller to tune the selected optimal combination of the setpoints can be easily computed when a function of the cost of operation in an analytical form is available. However, for controlling the VCSs, such an analytical function is usually unavailable. However, some embodiments are based on the realization that the probabilistic surrogate model 102 can be used in place of such an analytical function to compute the gradient $g_t$ of the cost of operation based on consecutive estimations of the cost of operation for the tuned combination of setpoints. To that end in an embodiment, the gradient estimate $g_t$ is generated, by the processor 204, in a data-driven manner using delays 510. Specifically, one embodiment involves taking gradients of kernel matrices of the Gaussian process directly with respect to each setpoint. Increments 504 in the function J is given as $$\Delta J_t := J(\theta_t) - J(\theta_{t-1})$$

along with incremental set points $$\Delta \theta_t := \theta_t - \theta_{t-1}.$$

The gradient is estimated in a data-driven manner by collecting a history of the set-point and corresponding steady-state power values and solving a linear equation $$\begin{bmatrix} \Delta J_{t-N_d+1} \\ \vdots \\ \Delta J_t \end{bmatrix} = \begin{bmatrix} \Delta J_{t-N_d+1} \\ \vdots \\ \Delta J_t \end{bmatrix} g_t;$$

Specifically, the gradient is estimated using a history of $N_d$ data points. In an embodiment, the processor 204 is configured to estimate the gradient $g_t$ of the cost of operation $J(\theta_t)$ caused by the perturbation by mapping the perturbed values of the selected optimal combination of the setpoints to values of the cost of operation on the surrogate model 102 according to the acquisition function 104.

Some embodiments are based on a recognition that, as the optimization problem is not static, recent data points contribute effectively to the gradient. Therefore, a recursive filter 506 is implemented to estimate the gradient 508, and a forgetting factor $\alpha \in (0,1)$ is included to assign importance to the recent data points rather than data of the past. The recursive filter 506 is described by $$e_t = \Delta J_t - \Delta \theta_t^\top g_{t-1}$$

$$K_t = \frac{P_{t-1} \Delta u_t}{\alpha + \Delta \theta_t^\top P_{t-1} \Delta \theta_t}$$

$$P_t = \frac{1}{\alpha} P_{t-1} - K_t \Delta u_t^\top P_{t-1}$$

$$g_t = g_{t-1} + K_t e_t$$

initialized with $P_{-1} = \alpha^{-1} I$ and $g_{-1} = 0$.

According to some embodiments, resetting matrix $P_t$ to $P_{-1}$ after a user-defined number of iterations improves the numerical stability of the gradient estimator. Since the recursive filter 506 needs a burn-in period, denoted by $\tau$, to generate meaningful gradient estimates, the gradient estimates are incorporated in the implementation of an ESC control law or a set-point update law 514 after the burn-in period, as follows:

$$\theta_{t+1} = \begin{cases} \theta_t + d_t, & t \leq \tau \\ \theta_t - k_g g_t + d_t, & t > \tau \end{cases}.$$

As evaluating the steady-state power requires data obtained by running experiments, which are expensive and time-consuming, there is a need to accelerate (obtain the lowest power without many experiments) the ESC. Since the ESC approaches require numerical estimation of the gradient, these estimates are typically noisy and only replicate a true gradient on average. Therefore, maintaining a constant step-size $k_g$ can result in degradation of closed-loop performance, because a small value of the step-size $k_g$ can result in slow convergence, whereas a large value can result in suboptimality due to overshooting around an optimum.

Some embodiments are based on the realization that the step-size can be adjusted based on gradient data history. Let $m_t$ and $v_t$ denote a current mean and standard deviation computed using last N gradient estimates $g_{t-N+1}, \ldots, g_t$ (also referred as gradient data). Based on the current mean $m_t$ and standard deviation $v_t$, an accelerated controller can be formulated. The accelerated controller has the form $$\theta_{t+1} = \theta_t - k_t \frac{m_t}{\sqrt{v_t + \epsilon}} + d_t$$

$$m_{t+1} = \beta_1 m_t + (1 - \beta_1) g_t$$

$$v_{t+1} = \beta_2 v_t + (1 - \beta_2) g_t \odot g_t$$

where $$k_t = k_g \frac{\sqrt{1 - \beta_2^t}}{(1 - \beta_1^t)}$$

where $k_t$ is an effective step-size, and $\epsilon > 0$ is a scalar that ensures that $v_t + \epsilon > 0$.

Figure 6:
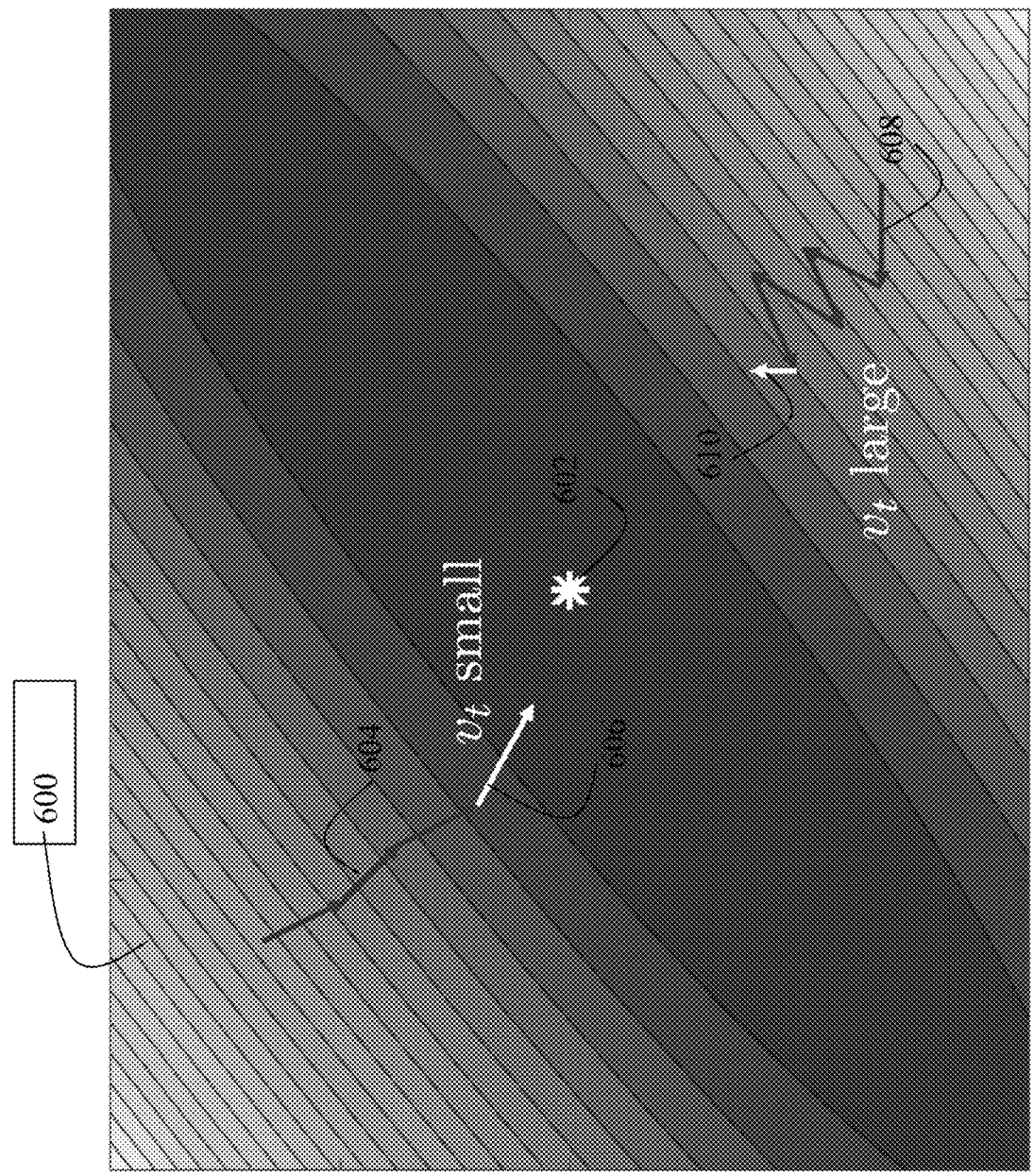
FIG. 6 illustrates adaptation of a step-size based on a mean and a standard deviation of gradient data, according to some embodiments.

FIG. 6 illustrates adaptation of the step-size based on a ratio $$\frac{m_t}{\sqrt{v_t + \epsilon}},$$

according to some embodiments. In FIG. 6, level sets 600 of a cost function to be optimized are shown. An optimizer is shown by a star 602. For a trajectory 604, the estimated gradients are consistently in the same direction with small variations. Therefore, the mean estimated $m_t$ is similar over iterations, and the variance $v_t$ is small. As a result, the ratio $$\frac{m_t}{\sqrt{v_t + \epsilon}}$$

is large, and allows a controller to take an aggressive step 606 in a descent direction.

For a trajectory 604, the estimated gradients are noisy, and therefore the variance $v_t$ is large. Consequently, the ratio $$\frac{m_t}{\sqrt{v_t + \epsilon}}$$

is small, which results a smaller step size and cautious movement 610 in the descent direction.

FIG. 7A shows an exemplary convex function 700, according to some embodiments. In the convex function 700, starting the ESC anywhere in domain 702 ensures that the minimum can be attained. FIG. 7B shows an exemplary non-convex function 704, according to some embodiments. In the non-convex function 704 including multiple minima 710a and 710b, the determination of a global minimum depends on which domain the ESC starts in. For example, if the ESC is started in domain 706, the ESC determines the global minimum, i.e., minimum 710a. However, if the ESC is started in domain 708, the ESC may determine only a minimum 710b (i.e., local minimum) and not the global minimum.

Some embodiments are based on a recognition that, if the function J is non-convex, determining the global minimum involves identifying a good initial guess, i.e., starting the ESC in a region where the function J is locally convex and includes the global minimum. Further, the gradient estimates are used within the region to identify the global minimum. Without a good initial guess, gradient-based algorithms may converge slowly and may be stuck in the local minimum.

Some embodiments are based on the realization that the surrogate model 102 can be used to start the ESC in the region (e.g., region 706) that most likely contains the global minimum. In particular, some embodiments are based on the realization that the probabilistic nature of the surrogate model 102 and its ability to estimate the cost of operation in the transient state of the VCS under control may fail to adequately capture the dynamics of the VCS in selecting the optimal combination of setpoints. To that end, some embodiments use the optimal combination of setpoints selected according to the probabilistic model to warm start the ESC exploring the VCS dynamics in a data-driven manner. Advantageously, ESC can optimize the control inputs in a model-free manner. However, the ESC can take several hours to converge to the optimal setpoints. Such slow convergence property of the ESC represents a barrier to a solution of real-time optimization of the performance of the vapor compression systems that can be overcome with warm starting according to various embodiments.

Figure 8:
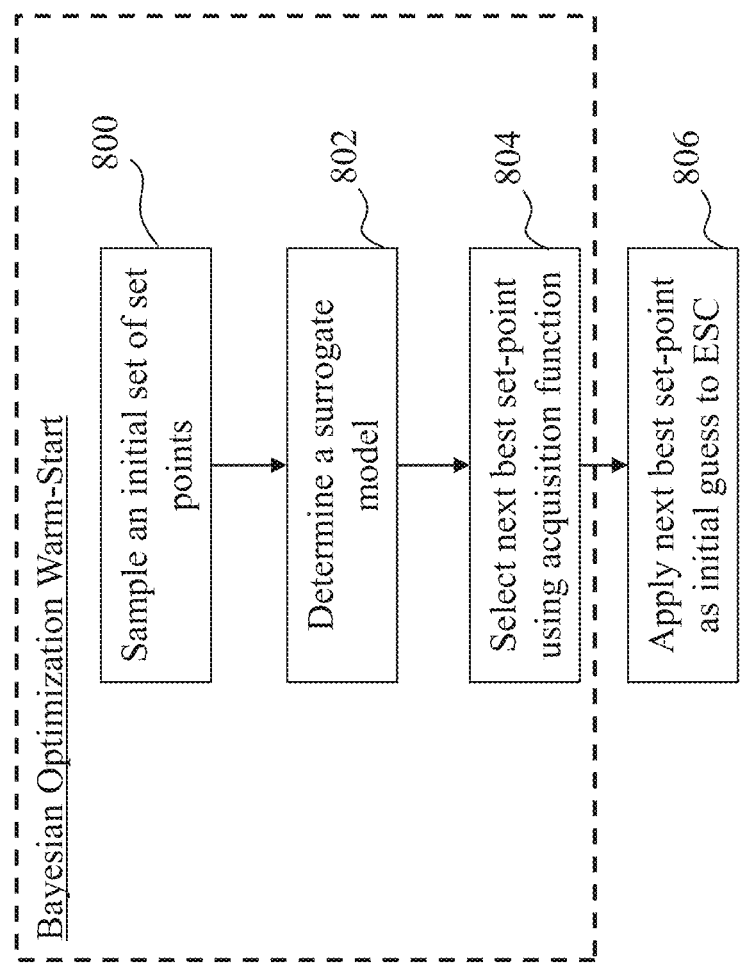
FIG. 8 shows a flow chart of a Bayesian-optimization warm-started ESC, according to some embodiments.

FIG. 8 shows a flow chart of a Bayesian-optimization warm-started ESC, according to some embodiments. The Bayesian-optimization warm-started ESC includes Bayesian-optimization warm-start mechanism to provide an initial guess for the ESC.

At step 800, an initial set of setpoints is sampled 800 in an admissible space of set points. The initial set of set points along with subsequent set points and the corresponding steady-state power outputs forms a data set. At step 802, a surrogate model is determined based on the data set. At step 804, the next best setpoint is selected using an acquisition function. In some implementations, the next best setpoint obtained may correspond to the combination of parameters having the largest likelihood of being the global minimum of the surrogate model. The steps 802 and 804 are described in detail in FIGS. 3 and 4.

At step 806, the next best setpoint obtained is applied as the initial guess to the ESC.

Multi-Zone Vapor Compression System

Some embodiments are based on the appreciation of the advantages of a multi-zone vapor compression system (MZ-VCS) in controlling residential and commercial premises. In an embodiment, the VCS 110 may correspond to MZ-VCS. The MZ-VCS includes at least a single compressor connected to multiple heat exchangers arranged in one or more indoor zones. The MZ-VCS is described in detail below with reference to FIGS. 9A and 9B.

Figure 9A:
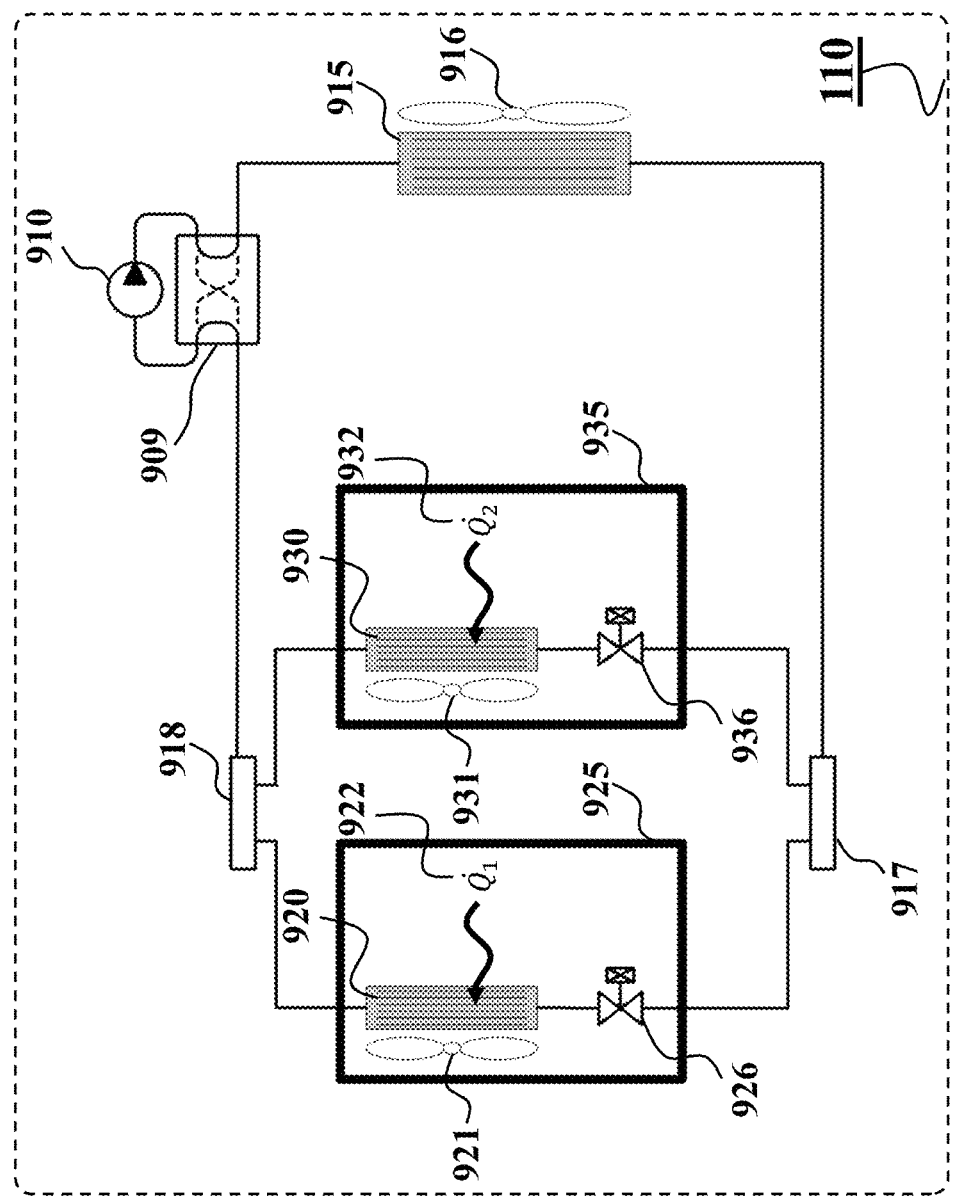
FIGS. 9A and 9B show block diagrams of a multi-zone vapor compression system (MZ-VCS), according to some embodiments.
Figure 9B:
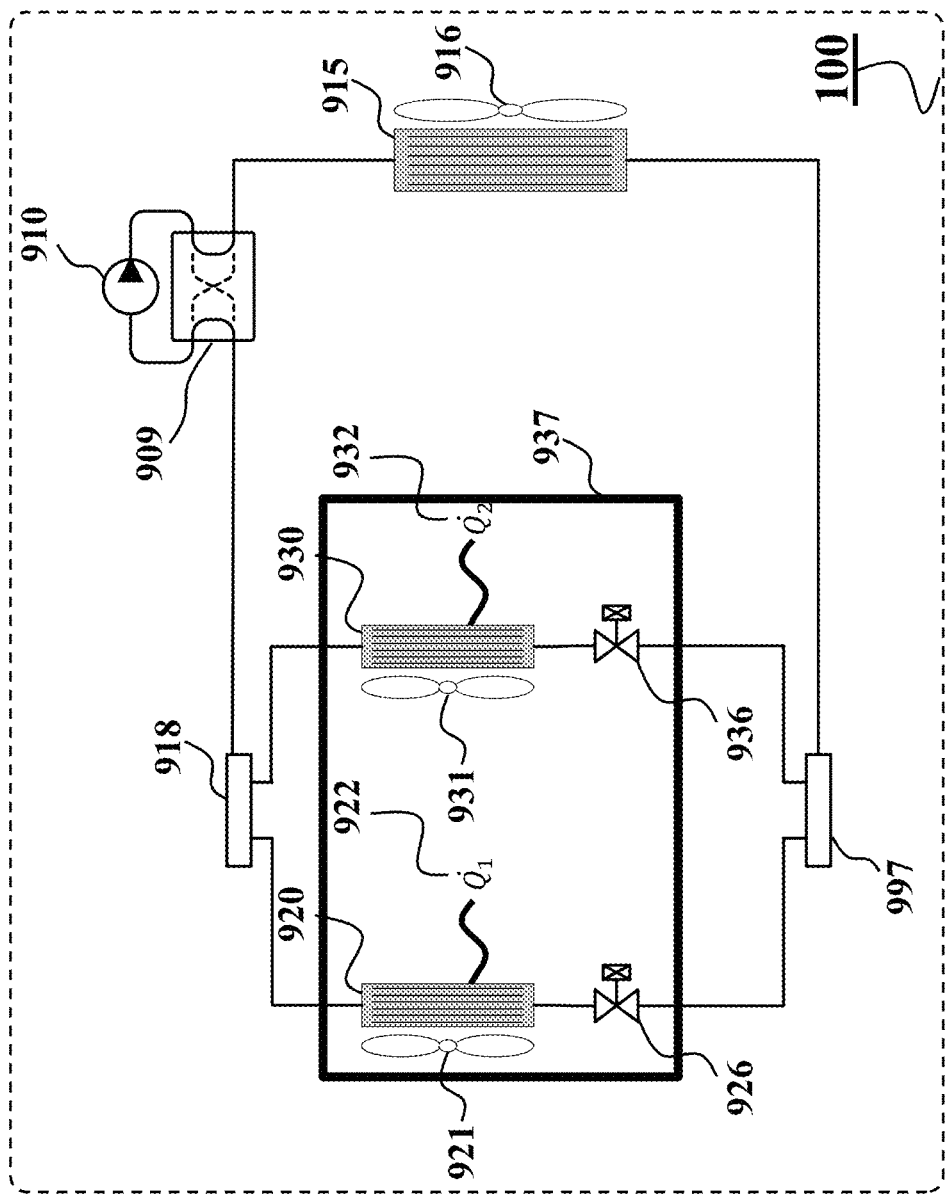

FIGS. 9A and 9B show block diagrams of the multi-zone vapor compression system (MZ-VCS), according to some embodiments. The MZ-VCS includes a compressor and a set of heat exchangers configured for controlling environments in a set of zones. There is at least one heat exchanger for each zone. For example, in one embodiment of FIG. 9A, each zone 925 or 935 corresponds to a room in a building enabling the MZ-VCS to provide cooling or heating to multiple zones simultaneously. In an alternative embodiment shown in FIG. 9B, multiple heat exchangers are placed in one room or zone 937 in a building enabling the MZ-VCS to provide cooling or heating to different sections of the room.

In this disclosure, a two-zone MZ-VCS is described for clarity, but it should be understood that any number of zones can be used, subject to physical limitations of refrigerant line lengths, capacity, and pumping power of the compressor, and building codes. If the zone is an indoor zone, such as a room or a portion of the room, the heat exchangers are indoor heat exchangers.

A compressor 910 receives a low-pressure refrigerant in a vapor state and performs mechanical work to increase the pressure and temperature of the refrigerant. Depending on the configuration of a four-way valve 909, the high-temperature refrigerant can be routed to either an outdoor heat exchanger (in which case the system moves heat to the outside environment and is proving useful cooling and is said to operate in cooling mode) or to an indoor heat exchanger (in which case the system moves heat to one or more indoor zones and is proving useful heating and is said to operate in heating mode).

For clarity and in order to simplify the subsequent description, a cooling mode is generally considered, i.e., the compressor is connected to the rest of the vapor compression system as shown as solid lines of the four-way valve 909, but it should be understood that analogous statements can be made about the system operating in heating mode with appropriate substitutions of the condenser for the evaporator, condensing temperature for evaporating temperature.

In cooling mode, the high-temperature, high-pressure refrigerant moves to an outdoor heat exchanger 915 and an associated optional fan 916 blows air across the outdoor heat exchanger 915. Heat is transferred from the refrigerant to the air, causing the refrigerant to condense from a vapor to a liquid.

The phase change process wherein vapor refrigerant condenses from saturated vapor to a two-phase mixture of both liquid and vapor to saturated liquid is isothermal in ideal descriptions of the vapor compression cycle, that is, the phase change process occurs at a constant temperature and therefore without a sensible change in temperature. However, if further heat is removed from the saturated liquid, the temperature of the saturated liquid then decreases by an appropriate amount, and the refrigerant is termed "subcooled." The subcool temperature is the temperature difference between the subcooled refrigerant and the calculated saturated liquid refrigerant temperature at the same pressure.

The liquid high-temperature refrigerant exits the outdoor heat exchanger 915 and is split by a manifold 917 in order to distribute the refrigerant between the subsequently connected indoor zones 925, 935, or 937. Separate expansion valves 926, 936 are connected to an inlet manifold. These expansion valves are restriction elements and cause the pressure of the refrigerant to be substantially reduced. Since the pressure is quickly reduced without substantial heat exchange in the expansion valves, the temperature of the refrigerant is substantially reduced, termed "adiabatic" in ideal descriptions of the vapor compression cycle. The resulting refrigerant exiting the valves is a low pressure, low-temperature two-phase mixture of liquid and vapor.

Two-phase refrigerant enters indoor heat exchangers 920, 930 where associated fans 921 and 931 blow air across the heat exchangers 920 and 930, respectively. Heat 922, 932 representing thermal loads from the indoor spaces is transferred from the zones to the refrigerant, causing the refrigerant to evaporate from a two-phase mixture of liquid and vapor to a saturated vapor state.

The phase change process wherein refrigerant evaporates from saturated vapor to a two-phase mixture of both liquid and vapor to saturated vapor is isothermal in ideal descriptions of the vapor compression cycle, i.e., occurs at a constant temperature and therefore is a process that occurs without a sensible change in temperature. However, if further heat is added to the saturated vapor, the temperature of the saturated vapor then increases by an appropriate amount and the refrigerant is termed "superheated." The superheat temperature is the difference between the superheated refrigerant vapor and the calculated saturated vapor temperature at the same pressure.

The low-pressure refrigerant vapor exiting the indoor unit heat exchangers is rejoined to a common flow path at the outlet manifold 918. Finally, low-pressure refrigerant vapor is returned to the compressor 910, and the cycle repeats.

The principal actuators in the MZ-VCS include the compressor 910, the outdoor heat exchanger fan 916, the indoor heat exchanger fans 921, 931, and the expansion valves 926, 936. In some systems, compressor speed can be fixed to one or more predetermined settings or varied continuously. Similarly, the outdoor heat exchanger fan 916 can operate at fixed speeds or varied continuously. In some configurations, the indoor heat exchanger fans 921, 931 can be determined by the MZ-VCS controller, or its speed can be determined by occupants when the occupants wish to directly control indoor airflow. The expansion valves are controlled, e.g., electronically-controlled, by the controlling device 200, to continuously vary from being in fully closed to fully open positions including all possible intermediate positions. Some MZ-VCS implementations substitute electronically-controlled expansion valves with a series combination of a solenoid valve for on/off control, and a separate variable opening valve for precise flowrate control.

The high and low refrigerant pressures are determined by thermodynamic conditions such as outdoor and indoor air temperature, the compressor speed and the joint combination of valve openings. Each of the expansion valves 926 and 936 can be set to different openings, but the overall high and low pressures are determined by a total pressure drop across these valves, which are arranged in parallel in the refrigerant circuit. Note that there are no pressure-reducing elements between the indoor heat exchangers 920 and 930 and the outlet manifold 918, and therefore all heat exchangers operate at substantially the same pressure. Moreover, due to the previously mentioned isothermal characteristic of phase change, all indoor heat exchangers are constrained to evaporate at the same temperature.

According to an embodiment, the heating or cooling capacity of the indoor heat exchangers 920 and 930 can be modulated by duty cycling each heat exchanger between "ON" and "OFF" modes of the operation. The heat exchangers 920 and 930 are OFF when an inlet valve that controls refrigerant flow is closed or alternatively, the compressor 910 that pumps the refrigerant through the system is stopped so that no cooling or heating is performed by the heat exchangers 920 and 930. The heat exchangers 920 and 930 are ON when an inlet valve is opened and the compressor 910 is operating so that the heat exchangers 920 and 930 in the indoor zones 925 and 935 operate at their full thermal capacity. A controller decides how to alternate between the modes based on a difference between an indoor zone temperature and a desired indoor zone temperature.

However, the act of switching heat exchangers ON and OFF, especially in the MZ-VCS where the zone heat exchangers can be switched ON and OFF independently from each other, resulting in persistent variations in the outputs of the system, such as zone temperatures and heat exchanger temperatures, that are known to be energetically inefficient and reduce occupant comfort. Accordingly, there is a need for a control system and method to smoothly control the thermal capacity of heat exchangers, such as the heat exchangers of MZ-VCS.

Some embodiments are based on the recognition that the probabilistic surrogate model 102 can be advantageously used to reduce the complexity of controlling the MZ-VCS. Specifically, in the MZ-VCS with a large number of set-points, brute-force sampling of the set-points can result in exorbitant computational expenditure and long tuning times. The sample-efficiency is greatly curtailed by using Bayesian optimization algorithms that can balance exploration and exploitation via the probabilistic surrogate model 102. According to some embodiments, a scalable, probabilistic machine learning algorithm is required for the MZ-VCS with a large number of set-points. In some embodiments, the scalable probabilistic machine learning algorithm may be based on a Bayesian deep neural network or a variational autoencoder.

Results

Figure 10:
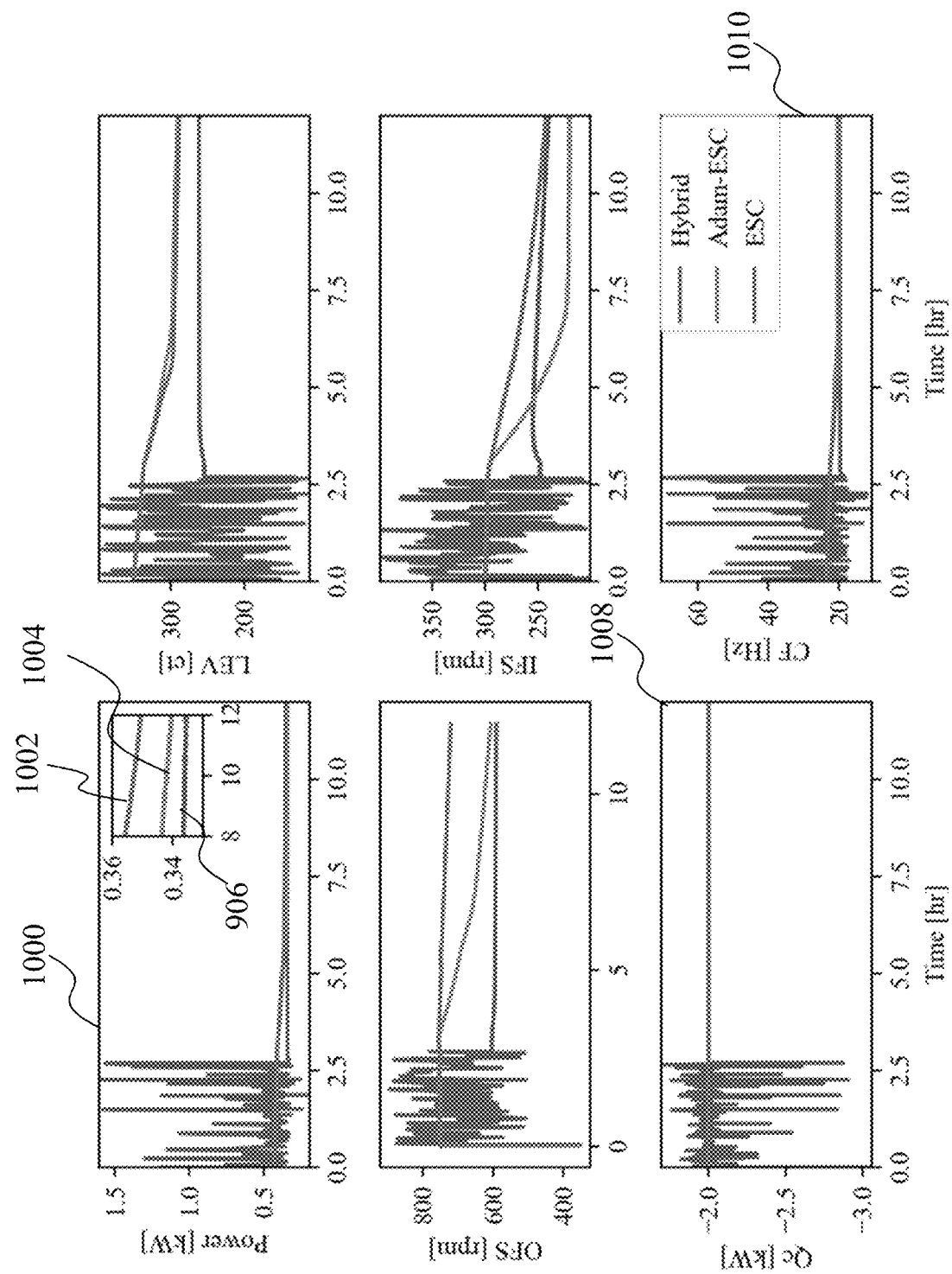
FIG. 10 shows performance results of a standard time-varying ESC, Adam-accelerated time-varying ESC, and the Bayesian-optimization warm-started ESC, according to some embodiments.

FIG. 10 shows performance results of a standard time-varying ESC, Adam-accelerated time-varying ESC, and the Bayesian-optimization warm-started ESC, according to some embodiments. For evaluating the performance, a system including a vapor compression cycle with a feedback controller is considered. The feedback controller is configured to regulate cooling capacity to a set-point by controlling compressor speed. Such a system facilitates a study of optimization methods on the vapor compression cycle without involving slower and low-pass thermal dynamics of an occupied space. Further, the optimizations methods (such as the standard time-varying ESC, the Adam-accelerated time-varying ESC, and the Bayesian-optimization warm-started ESC) are applied to adjust inputs (such as expansion valve position, indoor fan speed (IFS), and outdoor fan speed (OFS)) for the system to optimize power consumption.

For a case study, a PI loop is selected to regulate the cooling capacity of the vapor compression cycle to 2 kW, and the optimization methods are applied to determine optimal values for the expansion valve position and the fan speeds. PI gains are tuned offline (i.e., in advance). The PI gains are not known to set-point tuning mechanism.

In a power plot 1000, 1002 represents the standard time-varying ESC, 1004 represents the Adam-accelerated time-varying ESC, and 1006 represents the Bayesian-optimization warm-started ESC (hybrid). It can be noted from the power plot 1000 that the standard time-varying ESC 1002 and the Adam-accelerated time-varying ESC 1004 exhibit slower convergence compared with the Bayesian-optimization warm-started ESC 1006. The Bayesian-optimization warm-started ESC 1006 converges to a steady-state cycle power of 0.335 kW within 3 hr, whereas the other algorithms require more than 10 hours to approach the minimum cycle power.

According to an embodiment, a difference in steady-state cycle power is caused by a difference in optimal LEV (linear expansion valve) positions determined by the standard time-varying ESC 1002, the Adam-accelerated time-varying ESC 1004, and the Bayesian-optimization warm-started ESC 1006. Since the standard time-varying, ESC 1002, and the Adam-accelerated time-varying ESC 1004 are dependent on an initial LEV position, they converge to a steady-state LEV position of around 300 counts. On the other hand, the Bayesian-optimization warm-started ESC 1006 determines that a steady-state value of 260 counts yields significantly better energy efficiency. Because the Bayesian-optimization warm-started ESC 1006 includes an exploration phase, at the end of which, the BO warm-start yields an effective local set of tuning parameters. However, there is still local gradient information that can be exploited online, which leads to further lowering of the power consumption after the Bayesian optimization warm-start. Further, from plots 1008 and 1010, it can be observed that a capacity set point is attained throughout setpoint tuning procedure, but compressor frequency, which is coupled with the LEV position, gradually decreases to around 17 Hz rather than maintaining 40 Hz as intended.

Figure 11:
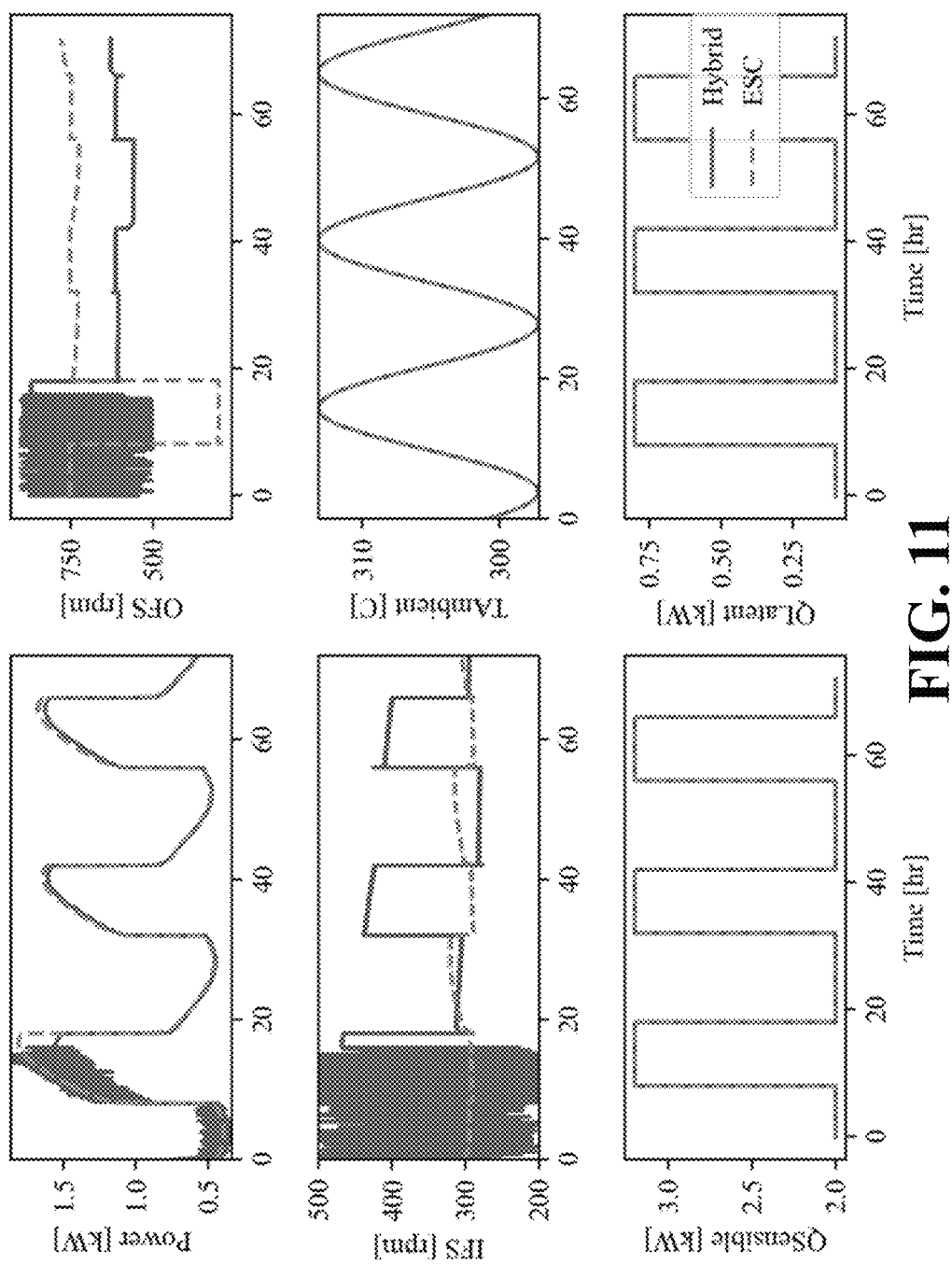
FIG. 11 illustrates performance results of the standard time-varying ESC and the Bayesian-optimization warm-started ESC for a complex system, according to some embodiments.

FIG. 11 illustrates performance results of the standard time-varying ESC and the Bayesian-optimization warm-started ESC for a complex system, according to some embodiments. The complex system includes the same cycle as described in the description of FIG. 10, but incorporated two feedback loops: one which regulated the room temperature to a set-point via control of the compressor speed, and another which regulates evaporator superheat temperature (CITE) to a set-point of 5° C. via control of the expansion valve position. The complex system is connected to a cubic room model with a volume of 27 m3 and a 20 cm thick envelope with thermal properties of wood, and external and internal heat transfer coefficients are of values 1.5 $Wm^{-2}$ and 3.5 $Wm^{-2}$ respectively. The complex system is operated according to a commercial office building that is occupied during day and unoccupied at night. As a result, sensible and latent heat loads in the space are set to 3200 W and 800 W between hours of 8 am and 6 pm, and 2000 W and 100 W otherwise. Ambient temperature is assumed to vary sinusoidally between 24° C. and 40° C. over a 24 hr period, with a peak temperature at 2 PM.

Further, two tunable inputs: the indoor fan speed (IFS) and outdoor fan speed (OFS) are considered. Both the tunable inputs are assumed to be bounded, and the bounds are known, for example, IFS in [200, 500] rpm, and OFS in [500, 900] rpm. The standard time-varying ESC and the Bayesian-optimization warm-started ESC are not given information about the temperature or heat profiles a priori, although the standard time-varying ESC and the Bayesian-optimization warm-started ESC assume that the heat loads can be measured at the current time instant.

The Bayesian-optimization warm-started ESC uses the first 18 hours to collect data for each of the load-modes i.e. when the heat load is high, and when the heat load is low. For each load-mode, a surrogate model (e.g., the surrogate model 102) of energy-efficiency and a corresponding optimal IFS and OFS pair is learned. After 18 hours, the Adam-accelerated time-varying ESC takes over and gradient-based updates are used for both the IFS and OFS. From the performance results, it can be noted that the standard time-varying ESC exhibit limited flexibility. For example, the IFS oscillates within a narrow range of 290-310 rpm, and the OFS is stagnant. Conversely, in the Bayesian-optimization warm-started ESC, the surrogate models allow for quick reset of ESC locations, which in turn results in improved energy efficiency. Also, it can be noted that the Bayesian-optimization warm-started ESC leads to improvement over days, for example, reduction in power after 48 hours (around 60-70 hour period) is more pronounced than in 24-48 hour period.

Figure 12:
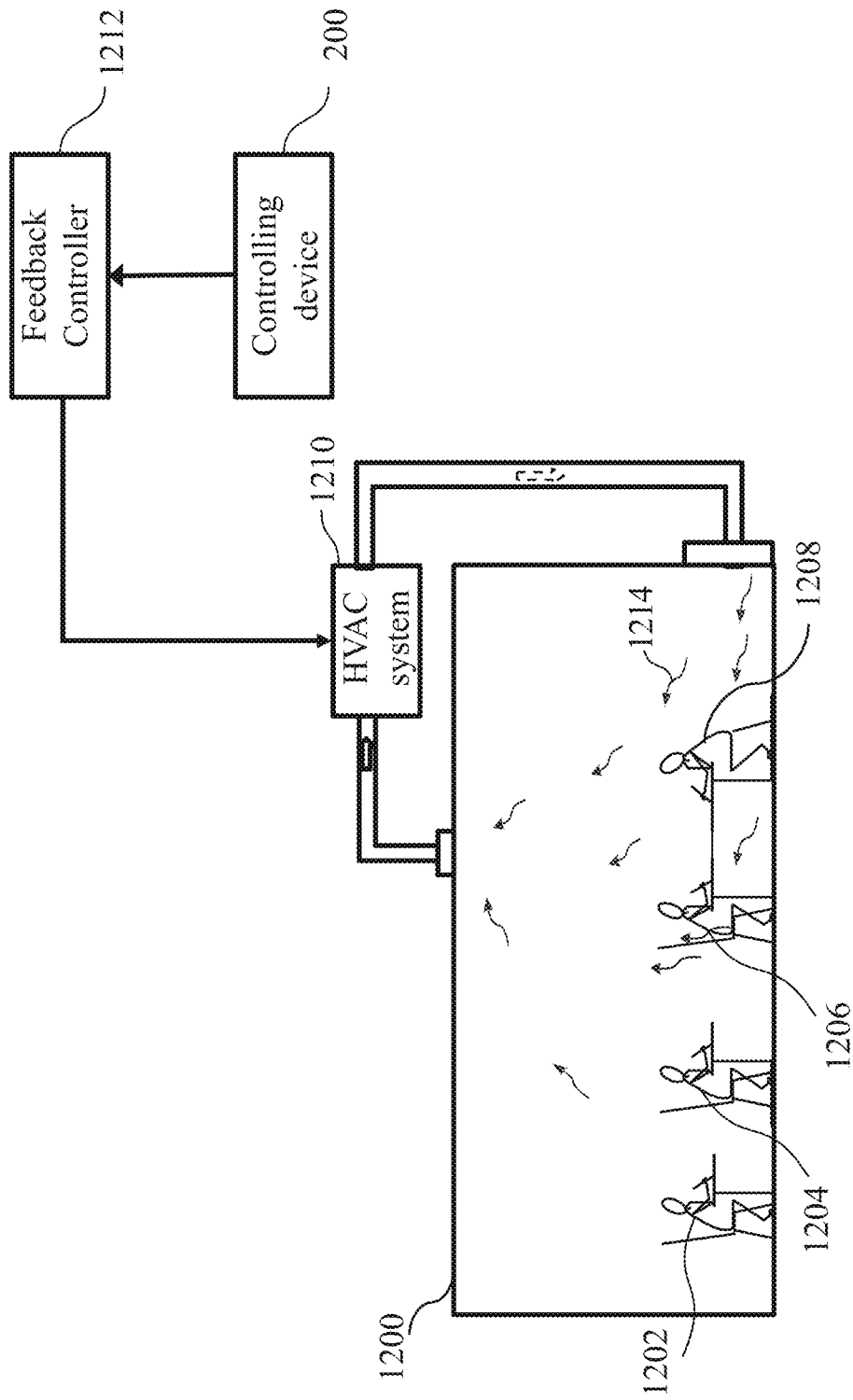
FIG. 12 illustrates controlling of heating, ventilating, and air-conditioning (HVAC system) using the controller, according to some embodiments.

FIG. 12 illustrates controlling of heating, ventilating, and air-conditioning (HVAC system) 1210 using the controlling device 200, according to some embodiments. An "HVAC" system refers to any heating, ventilating, and air-conditioning (HVAC) system implementing the vapor compression cycle. The HVAC systems 1210 span a very broad set of systems, ranging from systems that supply only outdoor air to occupants of a building, to systems which only control the temperature of a building, or to systems that control the temperature and humidity.

The HVAC system 1210 is arranged to condition room 1200. Room 1202 is occupied by occupants 1202, 1204, 1206, and 1208. Arrows 1214 represent air supplied by the HVAC system 1210 to condition room 1200. Based on the surrogate model (e.g., the surrogate model 102), the controller (e.g., the controlling device 200) determines an optimum combination of setpoints minimizing power consumption of the HVAC system 1210.

Further, the optimum combination of setpoints is input to a feedback controller 1212 associated with the HVAC system 1210. The feedback controller 1212 produces control commands based on the optimum combination of setpoints. The feedback controller 1212 further controls the HVAC system 1210 according to the control commands to minimize the power consumption of the HVAC system 1210.

Surrogate modeling-based optimization (such as the Bayesian-optimization warm-started ESC that uses the surrogate model 102) yields decisive advantages. For instance, machine learning methods enable the construction of a surrogate model of the vapor compression system's inputs to the performance outputs despite the noise in the measurements, for example, via Gaussian process regression. However, model-free approaches (such as ESC) estimate the gradients directly from noisy data which may result in undesirable effects such as oscillations in neighborhoods of optimal inputs or even divergence. Surrogate modeling also culminates in learning an input-output model upon achieving a termination criterion that can be stored, for example, on the cloud, for obtaining good initial guesses of inputs (warm-starting) in subsequent operations. Additionally, convergence rates improve with the surrogate modeling via smooth regressors, since smooth optimization methods such as first and second-order methods can be used directly on the surrogate model.

The above description provides exemplary embodiments only and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware, or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling an operation of a vapor compression system (VCS), comprising: at least one processor; and a non-transitory memory having instructions stored thereon that, when executed by the at least one processor, cause the controller to:
   control the operation of the VCS with different combinations of setpoints for different actuators of the VCS to estimate a cost of operation of the VCS for each of the different combinations of setpoints;
   compute, using a Bayesian optimization of the combinations of setpoints and their corresponding estimated costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping;
   select an optimal combination of setpoints having the largest likelihood of being a global minimum at the surrogate model according to an acquisition function of the first two order moments of the cost of operation;
   submit the selected optimal combination of the setpoints to a feedback controller to change states of the actuators of the VCS according to their corresponding setpoints in the selected optimal combination;
   execute an extremum seeking controller perturbing an input to the feedback controller starting from the selected optimal combination of the setpoints to tune the selected optimal combination of the setpoints based on a gradient of the cost of operation caused by the perturbation; and
   estimate the gradient of the cost of operation caused by the perturbation by mapping the perturbed values of the selected optimal combination of the setpoints to values of the cost of operation on the surrogate model according to the acquisition function.

2. The controller of claim 1, wherein the cost of operation for a combination of setpoints is estimated after the VCS is operated according to the combination of setpoints for a predetermined time insufficient for the VCS to reach a steady state.

3. The controller of claim 1, wherein at least some costs of operation are estimated during a transient state of the VCS operated according to the corresponding combination of setpoints.

4. The controller of claim 1, wherein the processor is further configured to estimate the cost of operation for the selected optimal combination of setpoints and uses the selected optimal combination of setpoints and the corresponding estimated cost of operation to update the surrogate model using the Bayesian optimization.

5. The controller of claim 4, wherein the processor is further configured to update the surrogate model recursively with a newly selected optimal combination of setpoints according to the acquisition function applied to the updated surrogate model until a termination condition is met.

6. The controller of claim 1, wherein the Bayesian optimization determines the probabilistic surrogate model using one or a combination of a Gaussian process regression, a neural process regression, and a machine learning.

7. The controller of claim 1, wherein the Bayesian optimization includes an acquisition function that exploits the probabilistic mapping provided by the surrogate model to direct querying of consequent setpoints.

8. The controller of claim 1, wherein the VCS is a multi-zone vapor compression system (MZ-VCS) including at least a single compressor connected to multiple heat exchangers arranged in one or more indoor zones.

9. The controller of claim 1, wherein the cost of operation corresponding to the combination of setpoints is power consumption of the VCS operated according to the combination of setpoints.

10. The controller of claim 1, wherein the feedback controller is one or a combination of a PI controller, a PID controller, an MPC controller, or a robust controller.

11. A method for controlling an operation of a vapor compression system (VCS), comprising:
   controlling the operation of the VCS with different combinations of setpoints for different actuators of the VCS to estimate a cost of operation of the VCS for each of the different combinations of setpoints;
   computing, using a Bayesian optimization of the combinations of setpoints and their corresponding estimated costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping;

selecting an optimal combination of setpoints having the largest likelihood of being a global minimum at the surrogate model according to an acquisition function of the first two order moments of the cost of operation;

submitting the selected optimal combination of the setpoints to a feedback controller to change states of the actuators of the VCS according to their corresponding setpoints in the selected optimal combination;

executing an extremum seeking controller perturbing an input to the feedback controller starting from the selected optimal combination of the setpoints to tune the selected optimal combination of the setpoints based on a gradient of the cost of operation caused by the perturbation; and estimating the gradient of the cost of operation caused by the perturbation by mapping the perturbed values of the selected optimal combination of the setpoints to values of the cost of operation on the surrogate model according to the acquisition function.

12. A non-transitory computer readable storage medium embodied thereon a program executable by a processor for performing a method for controlling an operation of a vapor compression system (VCS), the method comprising:

controlling the operation of the VCS with different combinations of setpoints for different actuators of the VCS to estimate a cost of operation of the VCS for each of the different combinations of setpoints;

computing, using a Bayesian optimization of the combinations of setpoints and their corresponding estimated costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping;

selecting an optimal combination of setpoints having the largest likelihood of being a global minimum at the surrogate model according to an acquisition function of the first two order moments of the cost of operation;

submitting the selected optimal combination of the setpoints to a feedback controller to change states of the actuators of the VCS according to their corresponding setpoints in the selected optimal combination;

executing an extremum seeking controller perturbing an input to the feedback controller starting from the selected optimal combination of the setpoints to tune the selected optimal combination of the setpoints based on a gradient of the cost of operation caused by the perturbation; and estimating the gradient of the cost of operation caused by the perturbation by mapping the perturbed values of the selected optimal combination of the setpoints to values of the cost of operation on the surrogate model according to the acquisition function.

* * * * *